United States Patent
Hashimoto et al.

(10) Patent No.: US 11,697,421 B2
(45) Date of Patent: Jul. 11, 2023

(54) METHOD FOR GENERATING VEHICLE CONTROLLING DATA, VEHICLE CONTROLLER, VEHICLE CONTROL SYSTEM, AND LEARNING DEVICE FOR VEHICLE

(71) Applicant: TOYOTA JIDOSHA KABUSHIKI KAISHA, Toyota (JP)

(72) Inventors: Yosuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 192 days.

(21) Appl. No.: 17/136,220

(22) Filed: Dec. 29, 2020

(65) Prior Publication Data

US 2021/0213963 A1 Jul. 15, 2021

(30) Foreign Application Priority Data

Jan. 9, 2020 (JP) .................................. 2020-002031

(51) Int. Cl.
*B60W 50/00* (2006.01)
*G07C 5/02* (2006.01)
(Continued)

(52) U.S. Cl.
CPC ............ *B60W 50/00* (2013.01); *G06N 20/00* (2019.01); *G07C 5/02* (2013.01);
(Continued)

(58) Field of Classification Search
CPC ......... B60W 50/00; B60W 2050/0083; B60W 2520/10; B60W 30/182; B60W 2552/05;
(Continued)

(56) References Cited

U.S. PATENT DOCUMENTS 5,410,477 A 4/1995 Ishii et al.
5,532,929 A 7/1996 Hattori et al.
(Continued)

FOREIGN PATENT DOCUMENTS

CN 105527963 A * 4/2016
ES 2 286 958 A1 12/2007
(Continued)

OTHER PUBLICATIONS

Office Action dated Jul. 26, 2022 in co-pending U.S. Appl. No. 16/948,973, citing documents 6 and 9 through 12 therein, 12 pages.
(Continued)

*Primary Examiner* — Sizo B Vilakazi
*Assistant Examiner* — Brian R Kirby
(74) *Attorney, Agent, or Firm* — Oblon, McClelland, Maier & Neustadt, L.L.P.

(57) ABSTRACT

A method for generating vehicle controlling data includes executing an operating process that operates an electronic device, executing an obtaining process that obtains a state of a vehicle, executing a reward calculation process that assigns a reward based on the state of the vehicle, and an updating process that updates relationship specifying data. The reward calculation process includes a changing process that changes a reward assigned when an area variable equals a second value and a property of the vehicle is a predetermined property from a reward assigned when the area variable equals a first value and the property of the vehicle is the predetermined property.

6 Claims, 10 Drawing Sheets

(51) Int. Cl.
*G06N 20/00* (2019.01)
*F02D 41/24* (2006.01)

(52) U.S. Cl.
CPC . *B60W 2050/0083* (2013.01); *B60W 2520/10* (2013.01); *F02D 41/2438* (2013.01)

(58) Field of Classification Search
CPC ......... B60W 2556/10; B60W 2556/45; B60W 2556/50; G06N 20/00; G06N 3/006; G06N 7/005; G07C 5/02; G07C 5/0808; F02D 41/2438; F02D 2200/501; F02D 41/2448; B60R 16/0231
USPC .......................................................... 701/70
See application file for complete search history.

(56) References Cited

U.S. PATENT DOCUMENTS

| | | | |
|---|---|---|---|
| 6,549,815 B1 | 4/2003 | Kaji | |
| 6,837,217 B1 | 1/2005 | Hoshino et al. | |
| 10,061,316 B2* | 8/2018 | Nishi | G05D 1/0088 |
| 10,235,881 B2* | 3/2019 | Nishi | G08G 1/161 |
| 11,125,179 B2* | 9/2021 | Hashimoto | F02D 31/003 |
| 11,248,553 B2 | 2/2022 | Hashimoto et al. | |
| 11,313,309 B2 | 4/2022 | Hashimoto et al. | |
| 2002/0157639 A1 | 10/2002 | Kidokoro et al. | |
| 2003/0055551 A1 | 3/2003 | Weber et al. | |
| 2004/0098197 A1 | 5/2004 | Matsumoto et al. | |
| 2008/0249667 A1* | 10/2008 | Horvitz | B60W 40/072 701/1 |
| 2009/0327011 A1* | 12/2009 | Petroff | G01C 21/343 705/5 |
| 2010/0204899 A1 | 8/2010 | Serres | |
| 2012/0117011 A1 | 5/2012 | Hashimoto et al. | |
| 2014/0018985 A1* | 1/2014 | Gupta | G01C 21/3469 180/65.265 |
| 2017/0185087 A1* | 6/2017 | Petroff | G06Q 10/06312 |
| 2018/0066593 A1 | 3/2018 | Uezono et al. | |
| 2018/0072317 A1 | 3/2018 | Hiwatashi et al. | |
| 2018/0086349 A1 | 3/2018 | Hiwatashi et al. | |
| 2018/0088571 A1* | 3/2018 | Weinstein-Raun | G05D 1/0027 |
| 2018/0134118 A1* | 5/2018 | Hintea | B60H 1/00742 |
| 2019/0072960 A1* | 3/2019 | Lin | G05D 1/0088 |
| 2019/0102668 A1* | 4/2019 | Yao | G06N 3/04 |
| 2019/0113918 A1* | 4/2019 | Englard | G06N 5/046 |
| 2019/0242319 A1 | 8/2019 | Matsumoto et al. | |
| 2019/0278282 A1* | 9/2019 | Palanisamy | G06N 3/08 |
| 2019/0360421 A1 | 11/2019 | Cancellieri et al. | |
| 2020/0263581 A1 | 8/2020 | Muto et al. | |
| 2020/0263618 A1 | 8/2020 | Muto et al. | |
| 2020/0332731 A1 | 10/2020 | Muto et al. | |
| 2021/0033039 A1 | 2/2021 | Hashimoto et al. | |
| 2021/0056781 A1 | 2/2021 | Hashimoto et al. | |
| 2021/0094587 A1 | 4/2021 | Pilly et al. | |
| 2021/0114536 A1 | 4/2021 | Hashimoto. et al. | |
| 2021/0114581 A1 | 4/2021 | Hashimoto et al. | |
| 2021/0114608 A1 | 4/2021 | Hashimoto et al. | |
| 2021/0115870 A1 | 4/2021 | Hashimoto et al. | |
| 2021/0115871 A1 | 4/2021 | Hashimoto. et al. | |
| 2021/0188276 A1 | 6/2021 | Hashimoto et al. | |
| 2021/0213963 A1 | 7/2021 | Hashimoto et al. | |
| 2021/0213966 A1 | 7/2021 | Hashimoto et al. | |
| 2021/0213975 A1 | 7/2021 | Hashimoto. et al. | |

FOREIGN PATENT DOCUMENTS

| | | | |
|---|---|---|---|
| JP | 4-293626 A | 10/1992 | |
| JP | 6-248997 A | 9/1994 | |
| JP | 10-254505 A | 9/1998 | |
| JP | 2000-250604 A | 9/2000 | |
| JP | 2002-251599 A | 9/2002 | |
| JP | 2003-49703 A | 2/2003 | |
| JP | 2004-257434 A | 9/2004 | |
| JP | 2009-19523 A | 1/2009 | |
| JP | 2009-167968 A | 7/2009 | |
| JP | 2016-6327 A | 1/2016 | |
| JP | 2016-169686 A | 9/2016 | |
| JP | 2019-619851 A | 7/2019 | |
| JP | 6547991 B1 | 7/2019 | |
| JP | 2019-144748 A | 8/2019 | |
| JP | 6590097 B1 | 10/2019 | |
| WO | WO 2018/084324 A1 | 5/2018 | |
| WO | WO 2018/105703 A1 | 6/2018 | |

OTHER PUBLICATIONS

Office Action dated Jul. 19, 2021 in co-pending U.S. Appl. No. 17/063,203, citing documents 1 through 12 therein, 9 pages.
Notice of Allowance dated Oct. 19, 2021 in co-pending U.S. Appl. No. 17/063,203, 9 pages.
Office Action dated Jun. 24, 2021 in co-pending U.S. Appl. No. 17/066,862, citing documents 9 through 12 therein, 8 pages.
Final Office Action dated Dec. 8, 2021 in co-pending U.S. Appl. No. 17/066,862, 7 pages.
Notice of Allowance dated Feb. 16, 2022 in co-pending U.S. Appl. No. 17/066,862, 8 pages.
Office Action dated Sep. 28, 2022 in co-pending U.S. Appl. No. 16/950,242, citing document 15 therein, 16 pages.
Notice of Allowance dated Nov. 30, 2022 In U.S. Appl. No. 16/948,973.
Notice of Allowance dated Feb. 3, 2023 in U.S. Appl. No. 16/950,242.
Corrected Notice of Allowability dated Feb. 1, 2023 in U.S. Appl. No. 16/948,973.
Corrected Notice of Allowability dated Feb. 15, 2023, in U.S. Appl. No. 16/950,242, 3 pages.
Notice of Allowability dated Mar. 8, 2023 in U.S. Appl. No. 16/948,973 (3 pages).
Corrected Notice of Allowability dated Mar. 20, 2023 in U.S. Appl. No. 16/948,973 (4 pages).

* cited by examiner

METHOD FOR GENERATING VEHICLE CONTROLLING DATA, VEHICLE CONTROLLER, VEHICLE CONTROL SYSTEM, AND LEARNING DEVICE FOR VEHICLE

BACKGROUND

1. Field

The following description relates to a method for generating vehicle controlling data, a vehicle controller, a vehicle control system, and a learning device for a vehicle.

2. Description of Related Art

Japanese Laid-Open Patent Publication No. 2016-6327 describes an example of a controller that operates a throttle valve, which is an operating unit of an internal combustion engine mounted on a vehicle, based on a value obtained by processing an operation amount of an accelerator pedal through a filter.

The filter needs to set an appropriate operation amount of the throttle valve of the internal combustion engine mounted on the vehicle in accordance with the operation amount (depression) of the accelerator pedal. Therefore, one skilled in the art typically needs to perform a large amount of work for adaptation of the filter. Typically, one skilled in the art performs a large amount of work for adaptation of, for example, an operating amount of an electronic device installed in a vehicle in accordance with the state of the vehicle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the present disclosure and their operation and advantages are as follows.

Aspect 1. An aspect of the present disclosure provides a method for generating vehicle controlling data. When relationship specifying data that specifies a relationship between a state of a vehicle and an action variable, which is a variable related to operation of an electronic device mounted on the vehicle, is stored in a storage device, the method includes executing an operating process that operates the electronic device with processing circuitry, executing an obtaining process that obtains an area variable, which is a variable indicating an area in which the vehicle is located, and a state of the vehicle based on a detection value of a sensor with the processing circuitry, executing a reward calculation process that assigns a reward based on the state of the vehicle obtained by the obtaining process with the processing circuitry, the reward assigned when a property of the vehicle meets a predetermined criterion being larger than the reward assigned when the property of the vehicle does not meet the predetermined criterion, and executing an updating process that uses the state of the vehicle obtained by the obtaining process, a value of the action variable used for operation of the electronic device, and the reward corresponding to operation of the electronic device as inputs to a predetermined update mapping to update the relationship specifying data with the processing circuitry. The update mapping is configured to output the relationship specifying data that is updated to increase an expected return of the reward when the electronic device is operated in accordance with the relationship specifying data. The reward calculation process includes a changing process that changes a reward assigned when the area variable equals a second value and the property of the vehicle is a predetermined property from a reward assigned when the area variable equals a first value and the property of the vehicle is the predetermined property.

In the method described above, a reward corresponding to operation of the electronic device is calculated to acknowledge what type of reward is obtained by the operation. The relationship specifying data is updated based on the reward using the update mapping in accordance with reinforcement learning. Thus, the relationship between the state of the vehicle and the action variable is appropriately set. This reduces the amount of work performed by one skilled in the art when appropriately setting the relationship between the state of the vehicle and the action variable.

Property requirements for a vehicle may vary in accordance with the area in which the vehicle is located. With the method described above, while changing the way of assigning a reward in accordance with the area variable, the relationship specifying data is learned through reinforcement learning. Thus, the learned relationship specifying data allows for execution of control that is appropriate to the area.

Aspect 2. In the method according to aspect 1, the area variable may include a value distinguishing between areas divided based on an average vehicle speed. The predetermined criterion may include a criterion related to acceleration response and a criterion related to energy usage efficiency. The reward calculation process may include a first process that assigns a greater reward when the criterion related to the acceleration response is met than when not met and a second process that assigns a greater reward when the criterion related to the energy usage efficiency is met than when not met. The changing process may include a process that changes at least one of the first process or the second process so that an increase in the energy usage efficiency is advantageous for obtaining a greater reward in an area where the average vehicle speed is low as compared to an area where the average vehicle speed is high.

With the changing process, in the area where the average vehicle speed is low, when the energy usage efficiency is increased, a greater reward is obtained more readily than when acceleration response is increased. Thus, the relationship specifying data that is learned through reinforcement learning allows for execution of control that increases the importance of the energy usage efficiency relative to the acceleration response in the area where the average vehicle speed is low.

Aspect 3. The method according to aspect 1 or 2 may further include executing a process that generates control mapping data that associates the state of the vehicle with a value of the action variable that maximizes the expected return so that the state of the vehicle is used as an input to output the value of the action variable that maximizes the expected return based on the relationship specifying data updated by the updating process with the processing circuitry.

The method described above generates control mapping data based on relationship specifying data that is learned through reinforcement learning. The relationship specifying data is installed in the controller, so that a value of the action variable that maximizes the expected return is readily set based on the state of the vehicle and the action variable.

Aspect 4. An aspect of the present disclosure provides a vehicle controller. The vehicle controller includes the storage device and the processing circuitry according to aspect 1 or 2. The operating process includes a process that operates the electronic device in accordance with a value of the action variable corresponding to the state of the vehicle based on the relationship specifying data.

The configuration described above sets a value of the action variable based on the relationship specifying data learned through reinforcement learning and operates the electronic device based on the value of the action variable. Thus, the electronic device is operated so that the expected return is increased.

Aspect 5. An aspect of the present disclosure provides a vehicle control system. The vehicle control system includes the processing circuitry and the storage device according to aspect 4. The processing circuitry includes a first execution device mounted on the vehicle and a second execution device different from an on-board device. The first execution device is configured to execute at least the obtaining process and the operating process. The second execution device is configured to execute at least the updating process.

In the configuration described above, the updating process is executed by the second execution device. This reduces calculation loads on the first execution device as compared to a configuration in which the first execution device executes the updating process.

The phrase "the second execution device being a device different from an on-board device" means that the second execution device is not an on-board device.

Aspect 6. An aspect of the present disclosure provides a vehicle controller including the first execution device according to aspect 5.

Aspect 7. An aspect of the present disclosure provides a learning device for a vehicle. The learning device includes the second execution device according to aspect 5.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

Embodiments of a method for generating vehicle controlling data, a vehicle controller, a vehicle control system, and a learning device for a vehicle will now be described with reference to the drawings.

First Embodiment

Figure 1:
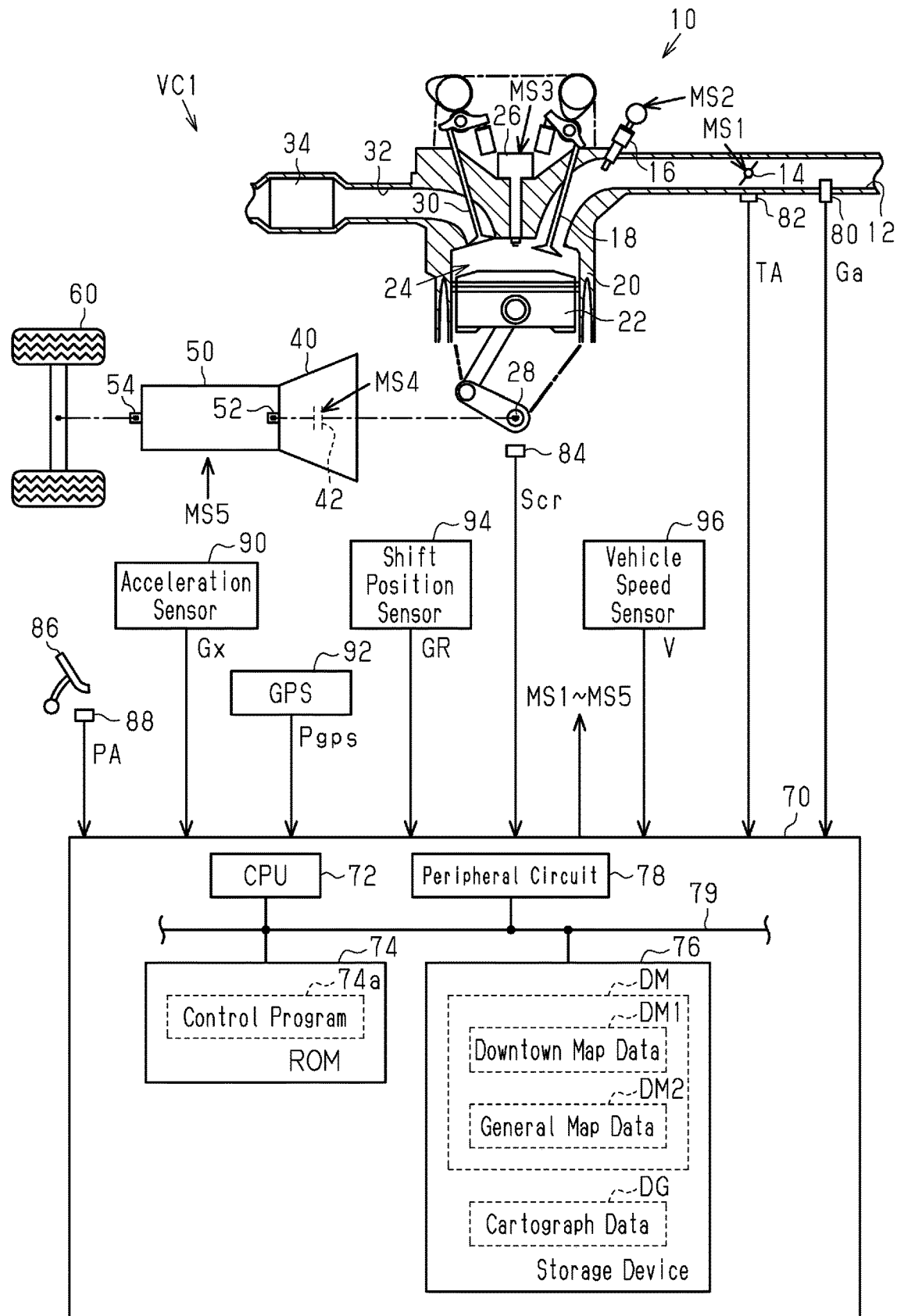
FIG. 1 is a diagram showing a controller and a drive system in a first embodiment.

FIG. 1 is a diagram showing the configurations of a drive system and a controller of a vehicle VC1 in the present embodiment.

As shown in FIG. 1, an internal combustion engine 10 includes an intake passage 12 provided with a throttle valve 14 and a fuel injection valve 16, which are sequentially arranged from the upstream side. When an intake valve 18 is open, air drawn into the intake passage 12 and fuel injected from the fuel injection valve 16 flow into a combustion chamber 24 defined by a cylinder 20 and a piston 22. In the combustion chamber 24, a mixture of the air and the fuel is burned by spark discharge of an ignition device 26, and energy generated by the combustion is converted into rotational energy of a crankshaft 28 via the piston 22. The burned air-fuel mixture is discharged to an exhaust passage 32 as exhaust when an exhaust valve 30 is open. The exhaust passage 32 is provided with a catalyst 34 used as a post-processing device that purifies the exhaust.

The crankshaft 28 is configured to be mechanically coupled to an input shaft 52 of a transmission 50 by a torque converter 40 including a lock-up clutch 42. The transmission 50 is a device that variably sets the transmission ratio, that is, the ratio of rotation speed of the input shaft 52 to rotation speed of an output shaft 54. The output shaft 54 is mechanically coupled to drive wheels 60.

The internal combustion engine 10 is controlled by a controller 70, which operates operating units of the internal combustion engine 10 such as the throttle valve 14, the fuel injection valve 16, and the ignition device 26 to control torque, an exhaust component ratio, and other control aspects. The controller 70 also controls the torque converter 40 and operates the lock-up clutch 42 to control the engagement state of the lock-up clutch 42. The controller 70 also controls the transmission 50 and operates the transmission 50 to control the transmission ratio, which is the control aspect of the transmission 50. FIG. 1 shows operating signals MS1, MS2, MS3, MS4, and MS5 of the throttle valve 14, the fuel injection valve 16, the ignition device 26, the lock-up clutch 42, and the transmission 50, respectively.

To control the control aspects, the controller 70 refers to an intake air amount Ga that is detected by an airflow meter 80, an opening degree of the throttle valve 14 (throttle opening degree TA) that is detected by a throttle sensor 82, and an output signal Scr of a crank angle sensor 84. In addition, the controller 70 refers to a depression amount of an accelerator pedal 86 (accelerator operation amount PA) that is detected by an accelerator sensor 88 and an acceleration rate Gx in the front-rear direction of the vehicle VC1 detected by an acceleration sensor 90. The controller 70 also refers to position data Pgps obtained from a global positioning system (GPS 92), a transmission ratio GR detected by a shift position sensor 94, and a vehicle speed V detected by a vehicle speed sensor 96.

The controller 70 includes a central processing unit (CPU) 72, a read only memory (ROM) 74, an electrically rewritable nonvolatile memory (storage device 76), and a peripheral circuit 78, which are configured to communicate with each other through a local network 79. The peripheral circuit 78 includes a circuit that generates a clock signal regulating an internal operation, a power supply circuit, a reset circuit, and the like.

The ROM 74 stores a control program 74a. The storage device 76 stores map data DM and cartograph data DG. The map data DM uses the present transmission ratio GR, the vehicle speed V, and time series data of the accelerator operation amount PA as input variables and uses a throttle opening degree instruction value TA*, that is, an instruction value of the throttle opening degree TA, and a transmission ratio instruction value GR*, that is, an instruction value of the transmission ratio GR, as output variables. The map data DM includes downtown map data DM1 and general map data DM2. The map data refers to a data set of discrete values of an input variable and values of an output variable corresponding to each value of the input variable. The general map data DM2 is expected to be used in a suburb, which is an area where an average vehicle speed is higher than downtown.

Figure 2:
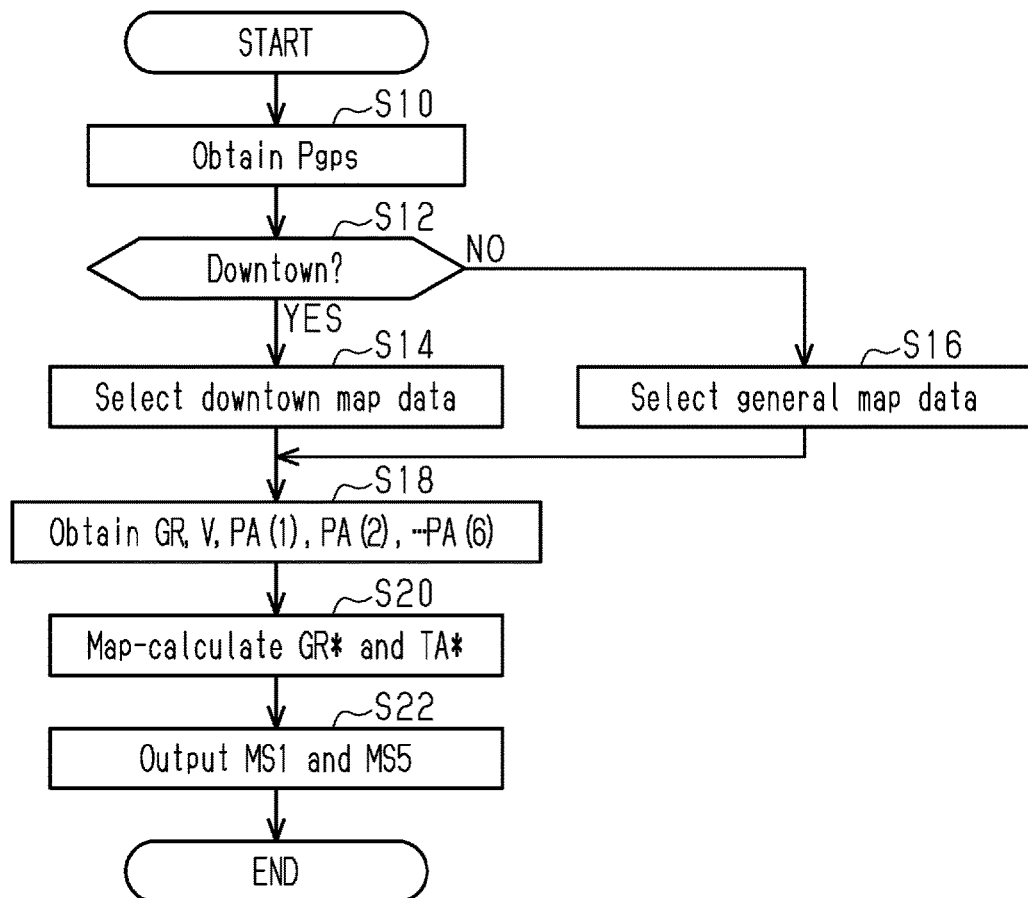
FIG. 2 is a flowchart showing the procedures of a process executed by the controller in the first embodiment.

FIG. 2 shows the procedures of a process executed by the controller 70 in the present embodiment. The process shown in FIG. 2 is implemented by the CPU 72, for example, repeatedly executing a program stored in the ROM 74 in a predetermined cycle. In the following description, the step number of each process is represented by a numeral provided with an "S" prefix.

In a series of the processes shown in FIG. 2, the CPU 72 first obtains the position data Pgps (S10). The CPU 72 specifies a position on the map indicated by the cartograph data DG based on the position data Pgps and determines whether the position corresponds to downtown (S12). If it is determined that the position corresponds to downtown (S12: YES), the CPU 72 selects the downtown map data DM1 (S14). If it is determined that the position does not correspond to downtown (S12: NO), the CPU 72 selects the general map data DM2 (S16).

Upon completion of the process of S14 or S16, the CPU 72 obtains the present transmission ratio GR, the vehicle speed V, and time series data including six sampling values of the accelerator operation amount PA, namely, "PA(1), PA(2), . . . PA(6)" (S18). The sampling values of time series data are sampled at different points in time. In the present embodiment, the time series data includes six sampling values that are sampled in a fixed sampling period and are consecutive on a time-series basis.

The CPU 72 executes map calculation of the throttle opening degree instruction value TA* and the transmission ratio instruction value GR* using the map selected in the process of S14 or S16 (S20). For example, when the value of an input variable matches any value of an input variable in the map data, the map calculation may use the corresponding value of an output variable in the map data as the calculation result. When the value of the input variable does not match any value of the input variable in the map data, the map calculation may use a value obtained by interpolating multiple values of the output variable included in the map data set as the calculation result.

The CPU 72 transmits an operating signal MS1 to the throttle valve 14 to operate the throttle opening degree TA and transmits an operating signal MS5 to the transmission 50 to operate the transmission ratio (S22). In the present embodiment, the throttle opening degree TA is feedback-controlled to the throttle opening degree instruction value TA*. This causes operating signals MS1 to differ from each other even when the throttle opening degree instruction value TA* is the same value.

Upon completion of the process of S22, the CPU 72 temporarily ends the series of the processes shown in FIG. 2.

Figure 3:
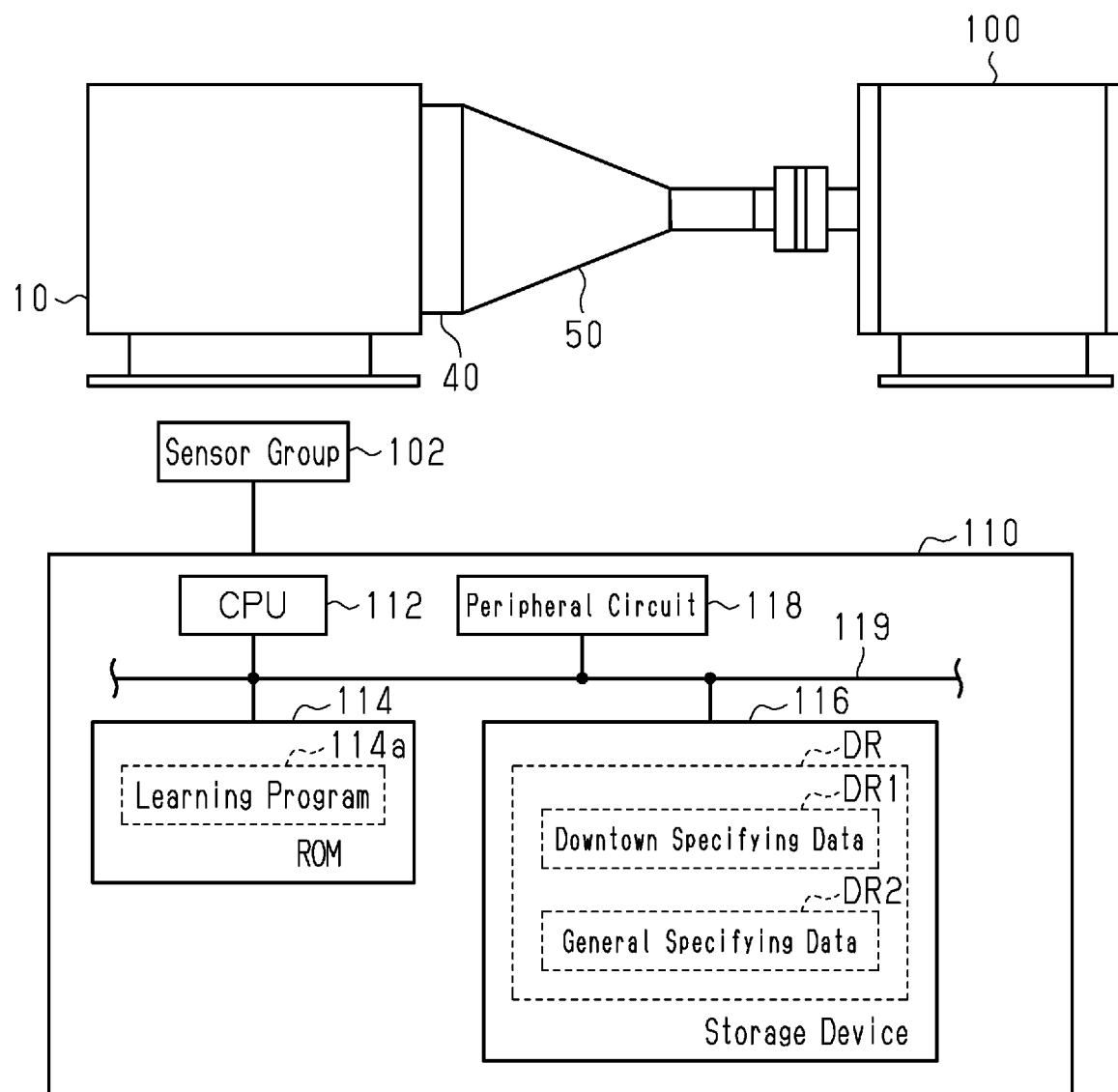
FIG. 3 is a diagram showing a system configured to generate map data in the first embodiment.

FIG. 3 shows a system configured to generate the map data DM.

As shown in FIG. 3, in the present embodiment, the crankshaft 28 of the internal combustion engine 10 is mechanically coupled to a dynamometer 100 by the torque converter 40 and the transmission 50. While the internal combustion engine 10 is running, a sensor group 102 detects various state variables, and the detection results are input to a generator 110 that is a computer configured to generate the map data DM. The sensor group 102 includes the sensors mounted on the vehicle VC1 shown in FIG. 1.

The generator 110 includes a CPU 112, a ROM 114, an electrically rewritable nonvolatile memory (storage device 116), and a peripheral circuit 118, which are configured to communicate with each other through a local network 119. The storage device 116 stores relationship specifying data DR that specifies the relationship of the time series data of the accelerator operation amount PA, the vehicle speed V, and the transmission ratio GR, which are state variables, with the throttle opening degree instruction value TA* and the transmission ratio instruction value GR*, which are action variables. The relationship specifying data DR includes downtown specifying data DR1 and general specifying data DR2. The ROM 114 stores a learning program 114a that learns the relationship specifying data DR through reinforcement learning.

Figure 4:
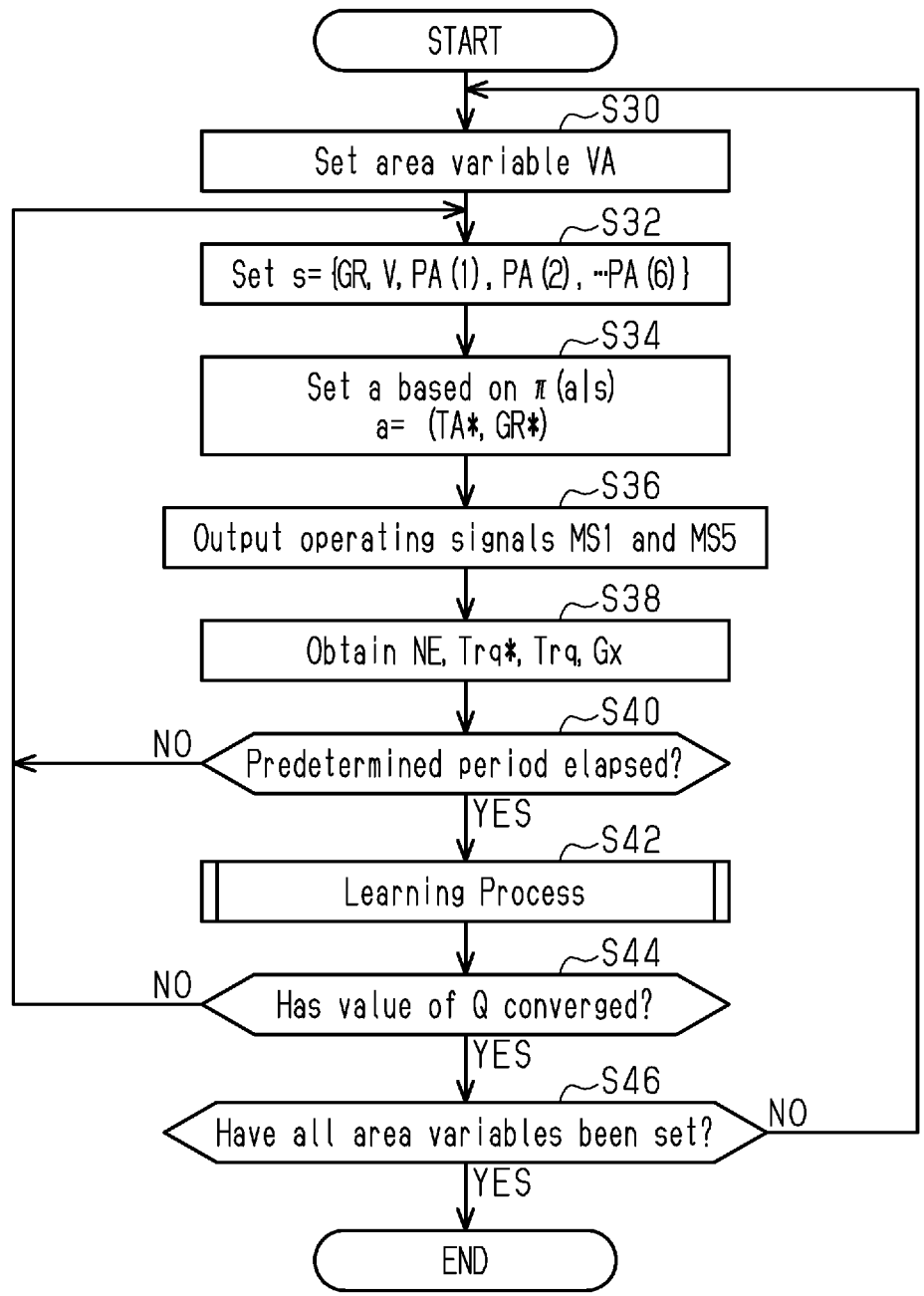
FIG. 4 is a flowchart showing the procedures of a process executed by the system in the first embodiment.

FIG. 4 shows the procedures of a process executed by the generator 110. The process shown in FIG. 4 is implemented by the CPU 112 executing the learning program 114a stored in the ROM 114.

In a series of the processes shown in FIG. 4, the CPU 112 first sets a value of an area variable VA that indicates whether the current position is downtown (S30). While the internal combustion engine 10 is running, the CPU 112 sets the present transmission ratio GR, the vehicle speed V, and time series data of the accelerator operation amount PA as a state s (S32). The time series data used in this process is the same as that used in the process of S18. However, the system shown in FIG. 3 does not include the accelerator pedal 86. The generator 110 simulates the state of the vehicle VC1 to generate a simulated accelerator operation (e.g. depression) amount PA. The simulated accelerator operation amount PA is used as a state of the vehicle based on a detection value of a sensor. In addition, the CPU 112 calculates the vehicle speed V as a traveling speed of a vehicle assuming that the vehicle actually exists. In the present embodiment, this vehicle speed is used as a state of the vehicle based on a detection value of a sensor. More specifically, the CPU 112 calculates a rotation speed NE of the crankshaft 28 based on the output signal Scr of the crank angle sensor 84, and calculates the vehicle speed V based on the rotation speed NE and the transmission ratio GR.

The CPU 112 sets an action a including the throttle opening degree instruction value TA* and the transmission ratio instruction value GR* corresponding to the state s obtained by the process of S32 in accordance with a policy π (S34). The policy π is determined by one of the downtown specifying data DR1 and the general specifying data DR2 that corresponds to the value of the area variable VA set in the process of S30.

In the present embodiment, the relationship specifying data DR determines an action value function Q and the policy π. In the present embodiment, the action value function Q is a table-type function indicating values of expected return corresponding to a ten-dimensional independent variable of the action a and the state s. When a state s is given, while giving priority to selecting the maximum action a (greedy action) in the action value function Q with the independent variable corresponding to the given state s, the policy π sets a rule of selecting another action a at a predetermined probability.

More specifically, in the present embodiment, the number of possible values of the independent variable in the action value function Q is such that some of all combinations of possible values of the state s and the action a are eliminated based on human knowledge or the like. That is, for example, when one of two consecutive sampling values in the time series data of the accelerator operation amount PA is the minimum value of the accelerator operation amount PA, the other sampling value may be the maximum value of the accelerator operation amount PA. Such sampling values cannot be obtained when the accelerator pedal 86 is manually operated and are not defined in the action value function Q. In addition, to avoid a sudden change in the transmission ratio GR from the second speed to the fourth speed, for example, when the present transmission ratio GR corresponds to the second speed, the transmission ratio instruction value GR* as a possible action a is limited to the first speed, the second speed, and the third speed. That is, when the transmission ratio GR as the state s corresponds to the second speed, the action a is not defined for the fourth or higher speeds. In the present embodiment, the dimensions are reduced based on the human knowledge or the like so that possible values of the independent variable defining the action value function Q are limited to the fifth power of ten or less, and more desirably, the fourth power of ten or less.

In the same manner as the process of S22, the CPU 112 outputs the operating signals MS1 and MS5 based on the throttle opening degree instruction value TA* and the transmission ratio instruction value GR* that are set (S36). The CPU 112 obtains the rotation speed NE, the transmission ratio GR, torque Trq of the internal combustion engine 10, a torque instruction value Trq* of the internal combustion engine 10, and the acceleration rate Gx (S38). The CPU 112 calculates the torque Trq based on a load torque generated by the dynamometer 100 and the transmission ratio of the transmission 50. The torque instruction value Trq* is set in accordance with the accelerator operation amount PA and the transmission ratio GR. In this embodiment, since the transmission ratio instruction value GR* is an action variable of reinforcement learning, the transmission ratio instruction value GR* may not limit the torque instruction value Trq* to be less than or equal to the maximum torque achievable by the internal combustion engine 10. Hence, the torque instruction value Trq* is not limited to a value that is less than or equal to the maximum torque achievable by the internal combustion engine 10. The CPU 112 also calculates the acceleration rate Gx, based on the load torque of the dynamometer 100, as a value that the vehicle is assumed to obtain if the internal combustion engine 10 is mounted on the vehicle. That is, in the present embodiment, although the acceleration rate Gx is a theoretical value, the acceleration rate Gx is used as a state of the vehicle based on a detection value of a sensor.

The CPU 72 determines whether a predetermined period has elapsed from the later one of the point in time when the process of S30 is executed and the point in time when the process S42 is executed (S40). The process of S42 will be described later. If it is determined that the predetermined period has elapsed (S40: YES), the CPU 112 updates the action value function Q through reinforcement learning (S42).

Figure 5:
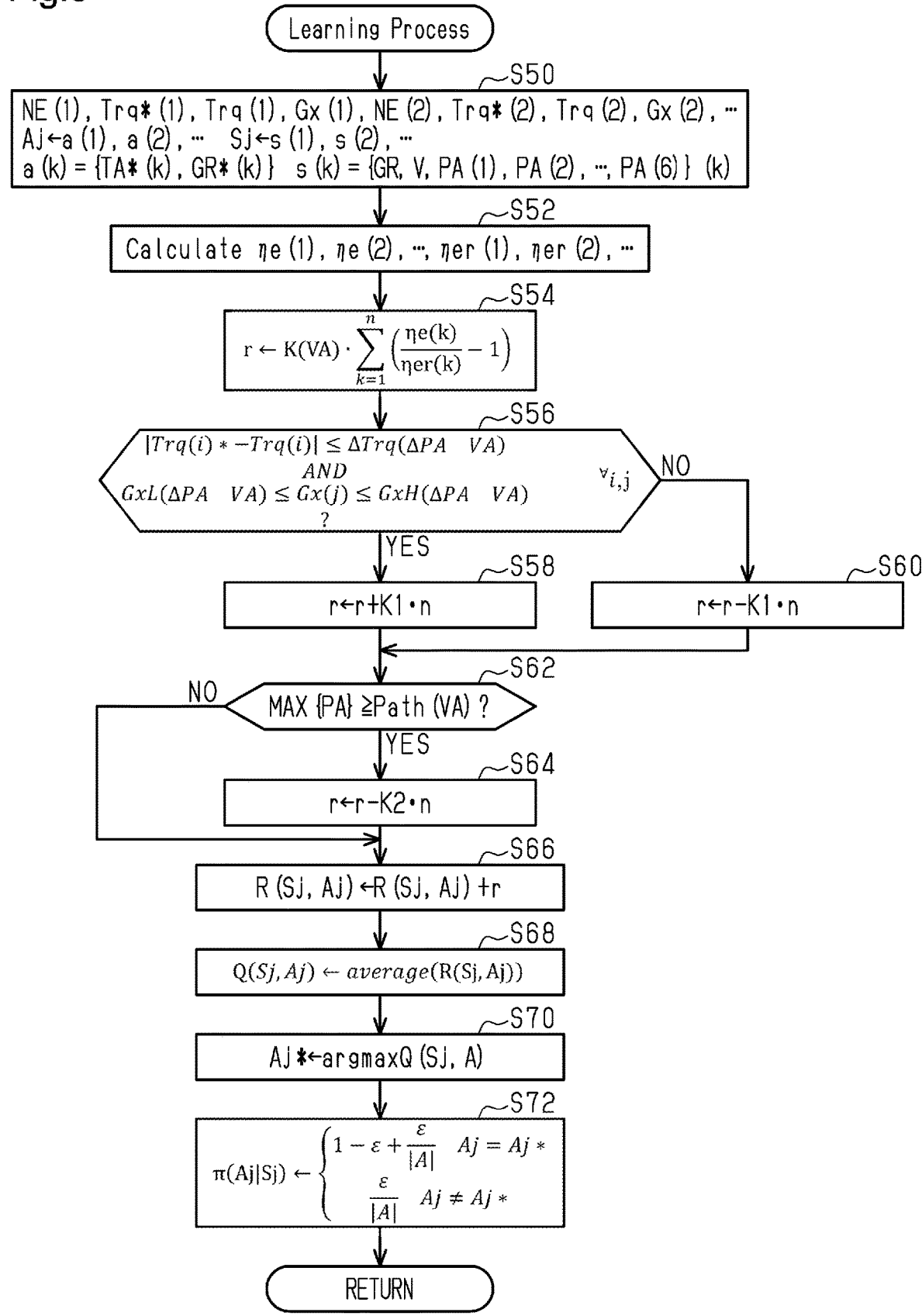
FIG. 5 is a flowchart showing details of a learning process in the first embodiment.

FIG. 5 shows details of the process of S42.

In a series of the processes shown in FIG. 5, in a predetermined period, the CPU 112 obtains time series data including sets of four sampling values, namely, the rotation speed NE, the torque instruction value Trq*, the torque Trq, and the acceleration rate Gx, and also obtains time series data of the state s and the action a (S50). In FIG. 5, elements having different numerals in parentheses indicate values of a variable sampled at different times. For example, the torque instruction value Trq*(1) and the torque instruction value Trq*(2) are sampled at different points in time. Time series data of the action a in the predetermined period is defined as an action set Aj. Time series data of the state s in the predetermined period is defined as a state set Sj.

The CPU 112 calculates time series data of efficiency ηe of the internal combustion engine 10 and time series data of reference efficiency ηer based on time series data of the torque Trq and the rotation speed NE (S52). More specifically, the CPU 112 calculates the efficiency ηe(k) of the internal combustion engine 10 and the reference efficiency ηer based on an operating point determined by the torque Trq(k) and the rotation speed NE(k), where k=1, 2, 3, . . . . The efficiency ηe is defined for each operating point of the internal combustion engine 10. The efficiency ηe is a ratio of combustion energy extracted as diving power to the entire combustion energy that is produced at a predetermined air-fuel ratio of the mixture in the combustion chamber 24 of the internal combustion engine 10 in a predetermined ignition timing. The reference efficiency ηer is also defined for each output of the internal combustion engine 10. When combustion energy is produced at a predetermined air-fuel ratio of the mixture in the combustion chamber 24 of the internal combustion engine 10 in a predetermined ignition timing, the reference ηer is a value obtained by multiplying the maximum value of the ratio of combustion energy extracted as driving power by a predetermined coefficient that is less than one. That is, at the operating point corresponding to when the ratio of combustion energy extracted as driving power is maximal, the reference efficiency ηer is obtained by multiplying the ratio by the predetermined coefficient. More specifically, for example, when the ROM 74 stores map data in which the torque Trq and the rotation speed NE are input variables and the efficiency ηe is an output variable, the CPU 72 executes map-calculation of the efficiency ηe. Also, for example, when the ROM 74 stores map data in which the product of the torque Trq and the rotation speed NE is output and used as an input variable, and the reference efficiency ηer is an output variable, the CPU 72 executes map-calculation of the reference efficiency ηer.

The CPU 112 obtains a value by dividing the efficiency ηe(k) by the reference efficiency ηer(k), subtracting one from the divided value, accumulating the values, and multiplying the accumulated value by a coefficient K, and then assigns the obtained value to a reward r (S54). In this process, when the efficiency ηe is greater than the reference efficiency ηer, the reward r has a greater value than when the efficiency ηe is less than the reference efficiency ηer.

The CPU 112 variably sets the coefficient K in accordance with the area variable VA. More specifically, when the area variable VA indicates downtown, the coefficient K is set to a greater value than when the area variable VA does not indicate downtown. This setting lowers the criterion of the efficiency when the area variable VA indicates downtown and a predetermined reward is assigned. That is, the efficiency ηe is lowered in downtown when obtaining the same reward. Thus, when an operating point corresponding to a high efficiency ηe is selected in downtown, the reward r has a greater value than outside downtown.

The CPU 112 determines whether the logical conjunction of conditions (A) and (B) is true (S56). Condition (A) is that the absolute value of a difference between any torque Trq and the torque instruction value Trq* in a predetermined period is less than or equal to a specified amount ΔTrq. Condition (B) is that the acceleration rate Gx is greater than or equal to a lower limit value GxL and less than or equal to an upper limit value GxH.

The CPU 112 variably sets the specified amount ΔTrq in accordance with the value of the area variable VA and a change amount ΔPA of the accelerator operation amount PA per unit time at the time of starting an episode. More specifically, when the absolute value of the change amount ΔPA is relatively large, the CPU 112 determines that the episode is related to a transition state and sets the specified amount ΔTrq to a greater value than when the episode is related to a steady state. Also, the CPU 112 sets the specified amount ΔTrq to a greater value in downtown than outside downtown.

The CPU 112 variably sets the lower limit value GxL in accordance with the change amount ΔPA of the accelerator operation amount PA at the time of starting an episode. That is, when the episode is related to the transition state and the change amount ΔPA is a positive value, the CPU 112 sets the lower limit value GxL to a greater value than when the episode is related to the steady state. When the episode is related to the transition state and the change amount ΔPA is a negative value, the CPU 112 sets the lower limit value GxL to a smaller value than when the episode is related to the steady state.

The CPU 72 variable sets the upper limit value GxH in accordance with the change amount ΔPA of the accelerator operation amount PA per unit time at the time of starting an episode. That is, when the episode is related to the transition state and the change amount ΔPA is a positive value, the CPU 72 sets the upper limit value GxH to a greater value than when the episode is related to the steady state. When the episode is related to the transition state and the change amount ΔPA is a negative value, the CPU 72 sets the upper limit value GxH to a smaller value than when the episode is related to the steady state.

The CPU 112 variably sets the lower limit value GxL and the upper limit value GxH in accordance with the value of the area variable VA. More specifically, the CPU 112 sets the lower limit value GxL and the upper limit value GxH so that the absolute value of the acceleration rate Gx is greater outside downtown than in downtown in the transition state.

If it is determined that the logical conjunction is true (S56: YES), the CPU 72 adds "K1·n" to the reward r (S58). If it is determined that the logical conjunction is false (S56: NO), the CPU 72 subtract "K1·n" from the reward r (S60). Here, "n" indicates the number of samples of the efficiency ηe in a predetermined period. The processes of S56 to S60 assign a greater reward when a criterion related to acceleration response is met than when the criterion is not met.

Upon completion of the process of S58 or S60, the CPU 112 determines whether condition (C) is satisfied (S62). Condition (C) is that the maximum value of the accelerator operation amount PA in a predetermined period is greater than or equal to a threshold value PAth. The CPU 112 sets the threshold value PAth to a greater value in downtown than outside downtown. If it is determined that condition (C) is satisfied (S62: YES), the CPU 112 subtracts "K2·n" from the reward r (S64). That is, when the accelerator operation amount PA is excessively large, the user may feel that the torque is insufficient. Hence, a negative reward is given to impose a penalty.

When the process of S64 is completed or a negative determination is made in S62, the CPU 112 updates the relationship specifying data DR stored in the storage device 76 shown in FIG. 3. In the present embodiment, an s-soft on-policy Monte Carlo method is used.

More specifically, the CPU 112 adds the reward r to each return R(Sj, Aj) determined by a combination of each state and its corresponding action retrieved in S50 (S66). "R(Sj, Aj)" collectively refers to a return R when one of the elements in the state set Sj is used as the state and one of the elements in the action set Aj is used as the action. The returns R(Sj, Aj) determined by combinations of each state and the corresponding action retrieved in S50 are averaged, and the average is assigned to the corresponding action value function Q(Sj, Aj) (S68). The averaging may be a process that divides the return R calculated in S68 by the number of times the process of S68 was executed. The initial value of the return R may be zero.

For each state retrieved in S50, the CPU 112 assigns an action including a combination of the throttle opening degree instruction value TA* and the transmission ratio instruction value GR* corresponding to the maximum value in the corresponding action value function Q(Sj, A) to an action Aj* (S70). In this description, "A" indicates any possible action. Although the action Aj* has different values in accordance with the type of state retrieved in S50, the presentation is simplified and denoted by the same symbol.

For each state retrieved in S50, the CPU 112 updates the corresponding policy π(Aj|Sj) (S72). More specifically, when the total number of actions is denoted by "|A|," the selection probability of the action Aj* selected by S72 is expressed as "(1−ε)+ε/|A|" The selection probability of each action other than the action Aj* is expressed as "ε/|A|." The number of actions other than the action Aj* is "|A|−1." The process of S72 is based on the action value function Q that is updated in S68. Thus, the relationship specifying data DR, which specifies the relationship between the state s and the action a, is updated to increase the return R.

Upon completion of the process of S72, the CPU 112 temporarily ends the series of the processes shown in FIG. 5.

Referring again to FIG. 4, upon completion of the process of S42, the CPU 112 determines whether the action value function Q has converged (S44). In this step, when an update amount of the action value function Q in the process of S42 is consecutively less than or equal to a predetermined value for a predetermined number of times, it may be determined that the action value function Q has converged. When it is determined that the action value function Q has not converged (S44: NO) or a negative determination is made in S40, the CPU 112 returns to S32. When it is determined that the action value function Q has converged (S44: YES), the CPU 112 determines whether an affirmative determination is made in S44 for each of downtown and non-downtown (S46).

If it is determined that the affirmative determination is not made in S44 for one of them (S46: NO), the CPU 112 returns to S30 and sets the area variable VA. If the affirmative determination is made in S46, the CPU 112 temporarily ends the series of the processes shown in FIG. 4.

Figure 6:
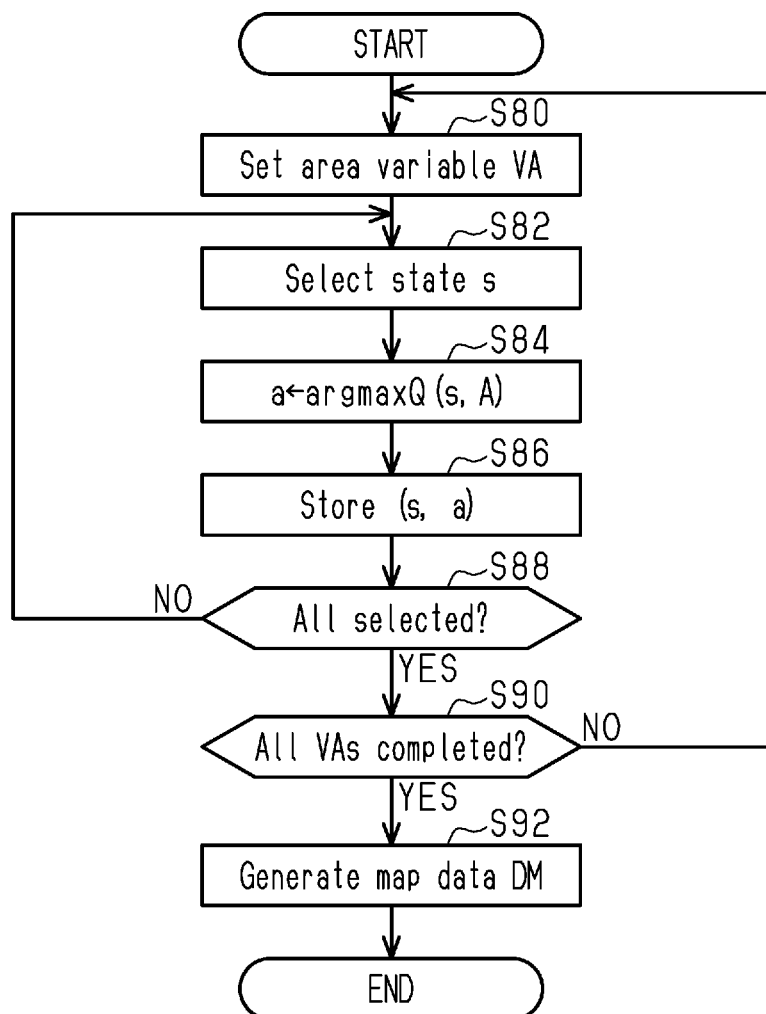
FIG. 6 is a flowchart showing the procedures of a map data generating process in the first embodiment.

FIG. 6 shows the procedures of a process executed by the generator 110 for generating the map data DM based on the action value function Q learned by the process shown in FIG. 4. The process shown in FIG. 6 is implemented by the CPU 112 executing the learning program 114a stored in the ROM 114.

In a series of the processes shown in FIG. 6, the CPU 112 first sets a value of the area variable VA (S80). The CPU 112 selects one from the states s as a value of an input variable of the map data DM (S82). Then, the CPU 112 selects an action a that maximizes the value of the action value function Q in the action value function Q(s, A) that corresponds to the state s and is specified by the one of the downtown specifying data DR1 and the general specifying data DR2 corresponding to the value of the area variable VA set in the process of S80 (S84). That is, in this step, the action a is selected based on a greedy policy. The CPU 112 stores the combination of the state s and the action a in the storage device 116 (S86).

The CPU 112 determines whether all of the values of the input variables in the map data DM have been selected by the process of S82 (S88). If it is determined that there is a non-selected value (S88: NO), the CPU 112 returns to S82. If it is determined that all of the values have been selected (S88: YES), the CPU 112 determines whether all of the possible values of the area variable VA have been set by the process of S80 (S90). If it is determined that there is an unset value (S90: NO), the CPU 112 returns to S80 and sets the value.

If it is determined that all of the values have been set (S90: YES), the CPU 112 generates the downtown map data DM1 and the general map data DM2 (S92). In this step, when a value of an input variable of the map data DM is the state s, the value of an output variable corresponding to the value of the input variable is the corresponding action a.

Upon completion of the process of S92, the CPU 112 temporarily ends the series of the processes shown in FIG. 6.

The operation and advantages of the present embodiment will now be described.

In the system shown in FIG. 3, the CPU 112 learns the action value function Q through reinforcement learning. When the value of the action value function Q has converged, it is determined that an appropriate action has been learned for meeting the required criterion of energy usage efficiency and the required criterion of acceleration response. The CPU 112 selects an action that maximizes the action value function Q for each state used as an input variable of the map data DM and stores the combination of the state and the action in the storage device 116. The CPU 112 generates the map data DM based on combinations of the state and the action stored in the storage device 116.

Thus, the throttle opening degree instruction value TA* and the transmission ratio instruction value GR* are appropriately set in accordance with the accelerator operation amount PA, the vehicle speed V, and the transmission ratio GR without overly increasing the amount of work performed by one skilled in the art.

In particular, in the present embodiment, the action a corresponding to the state s is separately learned in accordance with whether the current position is downtown. More specifically, rewards are assigned so that, while lowering the criterion of acceleration response, an increase in the efficiency $\eta e$ is more advantageous to downtown. As a result, when learning the downtown specifying data DR1, even at a relatively low acceleration response, condition (A) and condition (B) are satisfied and the reward is assigned by the process of S58, and maximization of the efficiency $\eta e$ is advantageous for increasing the total reward. The downtown map data DM1 allows for control that increases the energy usage efficiency.

When learning the general specifying data DR2, the reward assigned by the process of S54 is small for the increase in the efficiency $\eta e$. Therefore, satisfying condition (A) and condition (B) to obtain the reward in the process S58 is advantageous for increasing the total reward. The general map data DM2 allows for control that achieves a good responsiveness to an accelerator operation of the user.

The present embodiment described above further obtains the following operation and advantages.

(1) The storage device 76 of the controller 70 stores the map data DM instead of the action value function Q. In this configuration, the CPU 72 sets the throttle opening degree instruction value TA* and the transmission ratio instruction value GR* based on map-calculation using the map data DM. This reduces a calculation load as compared to a configuration that executes a process for selecting the action value function Q having the maximum value.

(2) The independent variables of the action value function Q include time series data of the accelerator operation amount PA. As compared to a configuration in which the independent variables include only a single sampling value of the accelerator operation amount PA, the value of the action a is finely adjusted in accordance with various changes in the accelerator operation amount PA.

(3) The independent variables of the action value function Q include the throttle opening degree instruction value TA*. This increases the degree of freedom for exploration by reinforcement learning as compared to, for example, a configuration in which a model-type parameter that models behavior of the throttle opening degree instruction value TA* is used as an independent variable related to the throttle opening degree.

Second Embodiment

A second embodiment will now be described with reference to the drawings. The differences from the first embodiment will mainly be discussed.

Figure 7:
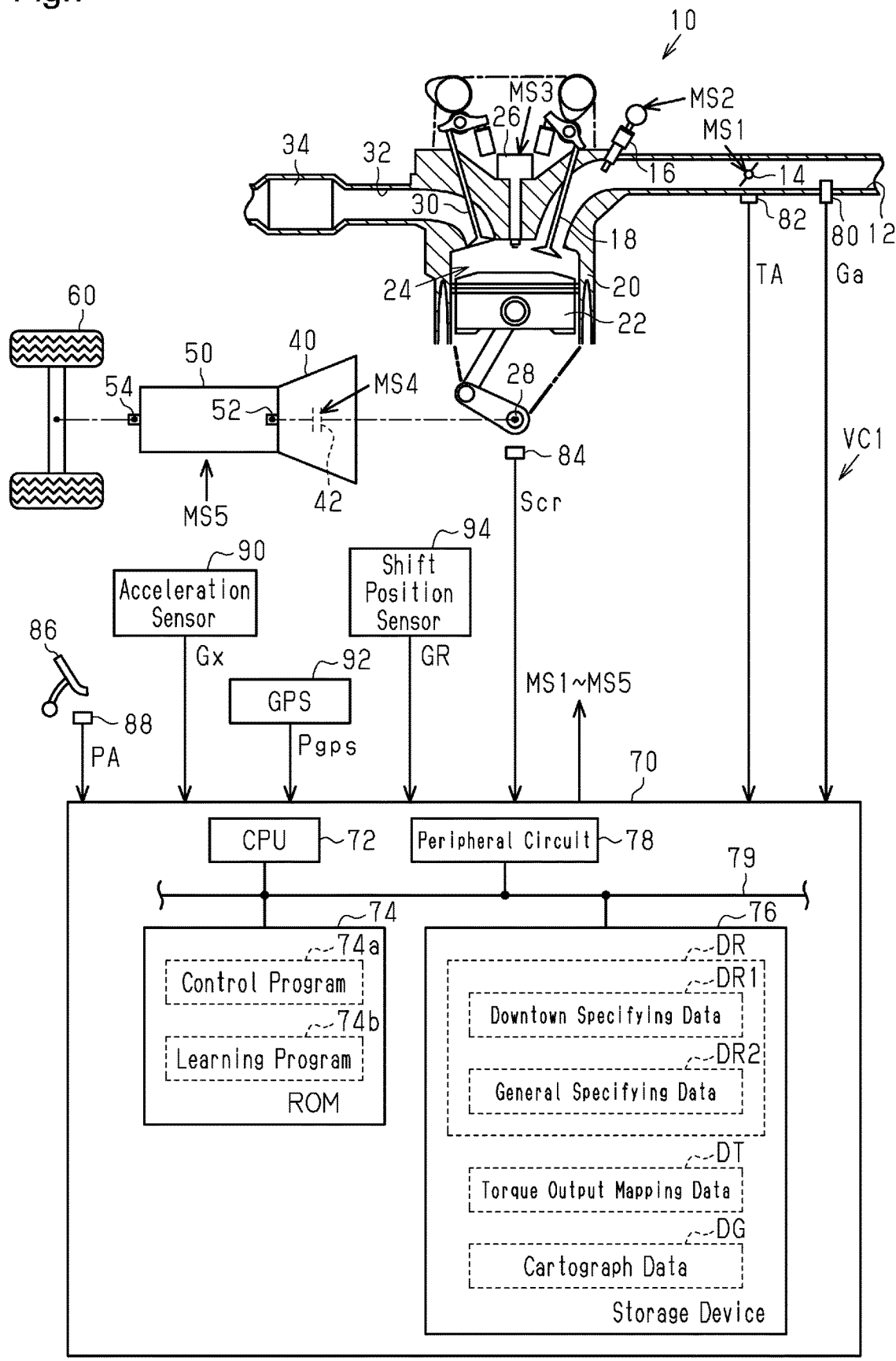
FIG. 7 is a diagram showing a controller and a drive system in a second embodiment.

FIG. 7 is a diagram showing a drive system and a controller of a vehicle VC1 in the present embodiment. For the sake of convenience, in FIG. 7, the same reference numerals are given to the components that are the same as those in FIG. 1.

As shown in FIG. 7, in the present embodiment, the ROM 74 stores a learning program 74b in addition to the control program 74a. The storage device 76 does not store the map data DM and, instead, stores the relationship specifying data DR and torque output mapping data DT. Relationship specifying data DR is data that has been learned in the process shown in FIG. 4. In the relationship specifying data DR, the state s includes the time series data of the accelerator operation amount PA, the vehicle speed V, and the transmission ratio GR, and the action a includes the throttle opening degree instruction value TA* and the transmission ratio instruction value GR*. The relationship specifying data DR includes downtown specifying data DR1 and general specifying data DR2. The torque output mapping data DT specifies a torque output mapping, which is data related to a learned model such as a neural network that uses the rotation speed NE, charging efficiency ii, and an ignition timing as inputs to output the torque Trq. For example, when the process shown in FIG. 4 is executed, the torque output mapping data DT may be obtained by learning the torque Trq obtained in the process of S38 as training data. The charging efficiency η may be calculated by the CPU 72 based on the rotation speed NE and the intake air amount Ga.

Figure 8:
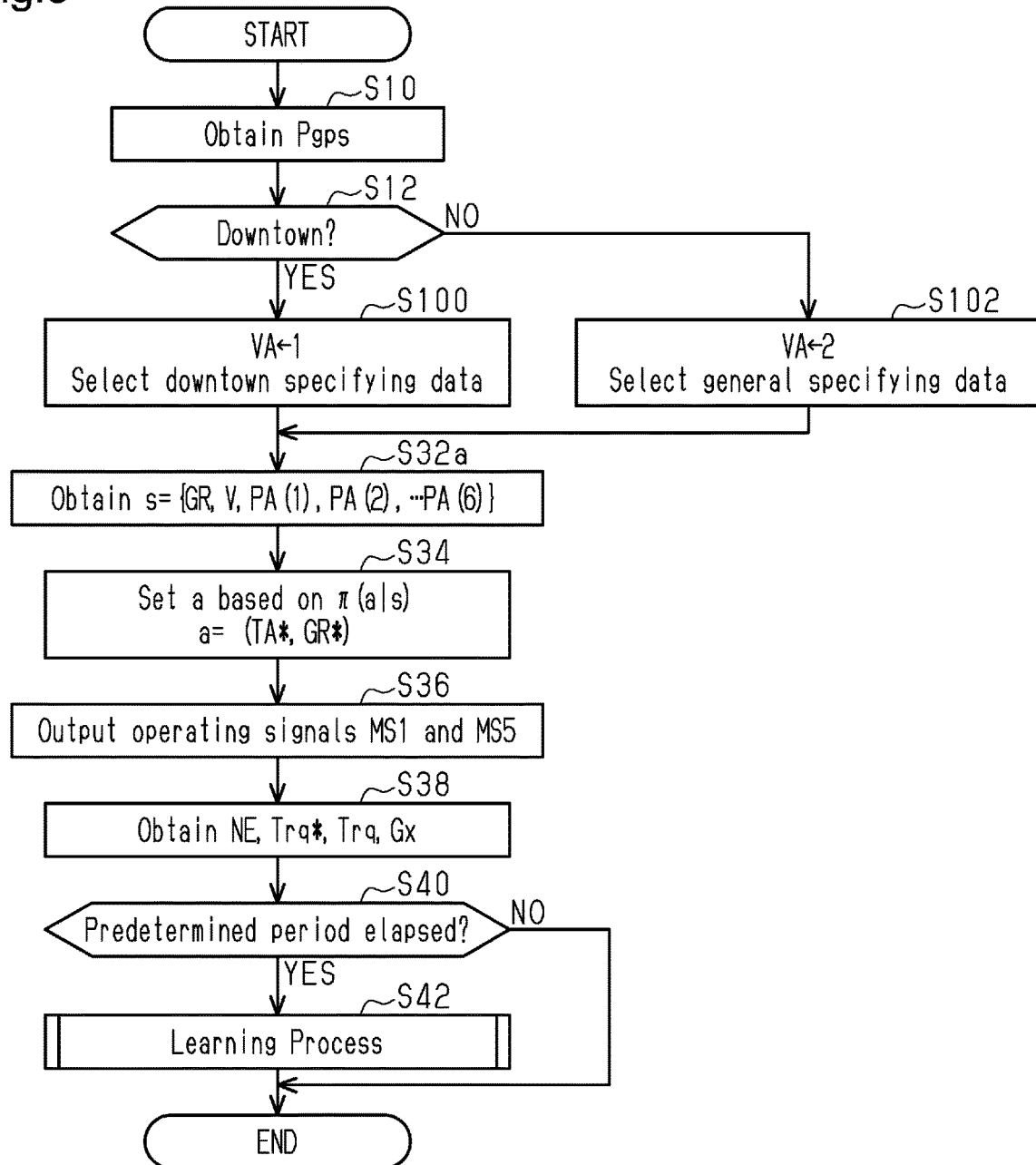
FIG. 8 is a flowchart showing the procedures of a process executed by the controller in the second embodiment.

FIG. 8 shows the procedures of a process executed by the controller 70 in the present embodiment. The process shown in FIG. 8 is implemented by the CPU 72, for example, repeatedly executing the control program 74a and the learning program 74b stored in the ROM 74 in a predetermined cycle. For the sake of convenience, in FIG. 8, the same step numbers are given to the processes corresponding to those in FIG. 4.

In a series of the processes shown in FIG. 8, the CPU 72 first executes the processes of S10 and S12 as in FIG. 2. If it is determined that the current position is downtown (S12: YES), the CPU 72 assigns "1" to the area variable VA and selects the downtown specifying data DR1 (S100). If it is determined that the current position is not downtown (S12: NO), the CPU 72 assigns "2" to the area variable VA and selects the general specifying data DR2 (S102). Upon completion of the process of S100 or S102, the CPU 112 obtains the time series data of the accelerator operation amount PA, the present transmission ratio GR, and the vehicle speed V as the state s (S32a) and executes the processes of S34 to S42 as in FIG. 4. When a negative determination is made in S40 or the process of S42 is completed, the CPU 72 temporarily ends the series of the processes shown in FIG. 8. The processes of S10, S12, S100, S102, S32a, and S34 to S40 are implemented by the CPU 72 executing the control program 74a. The process of S42 is implemented by the CPU 72 executing the learning program 74b.

In the present embodiment, the controller 70 includes the relationship specifying data DR and the learning program 74b, so that the frequency of learning is improved as compared to the first embodiment.

Third Embodiment

A third embodiment will now be described with reference to the drawings. The differences from the second embodiment will mainly be discussed.

In the present embodiment, relationship specifying data DR is updated outside the vehicle VC1.

Figure 9:
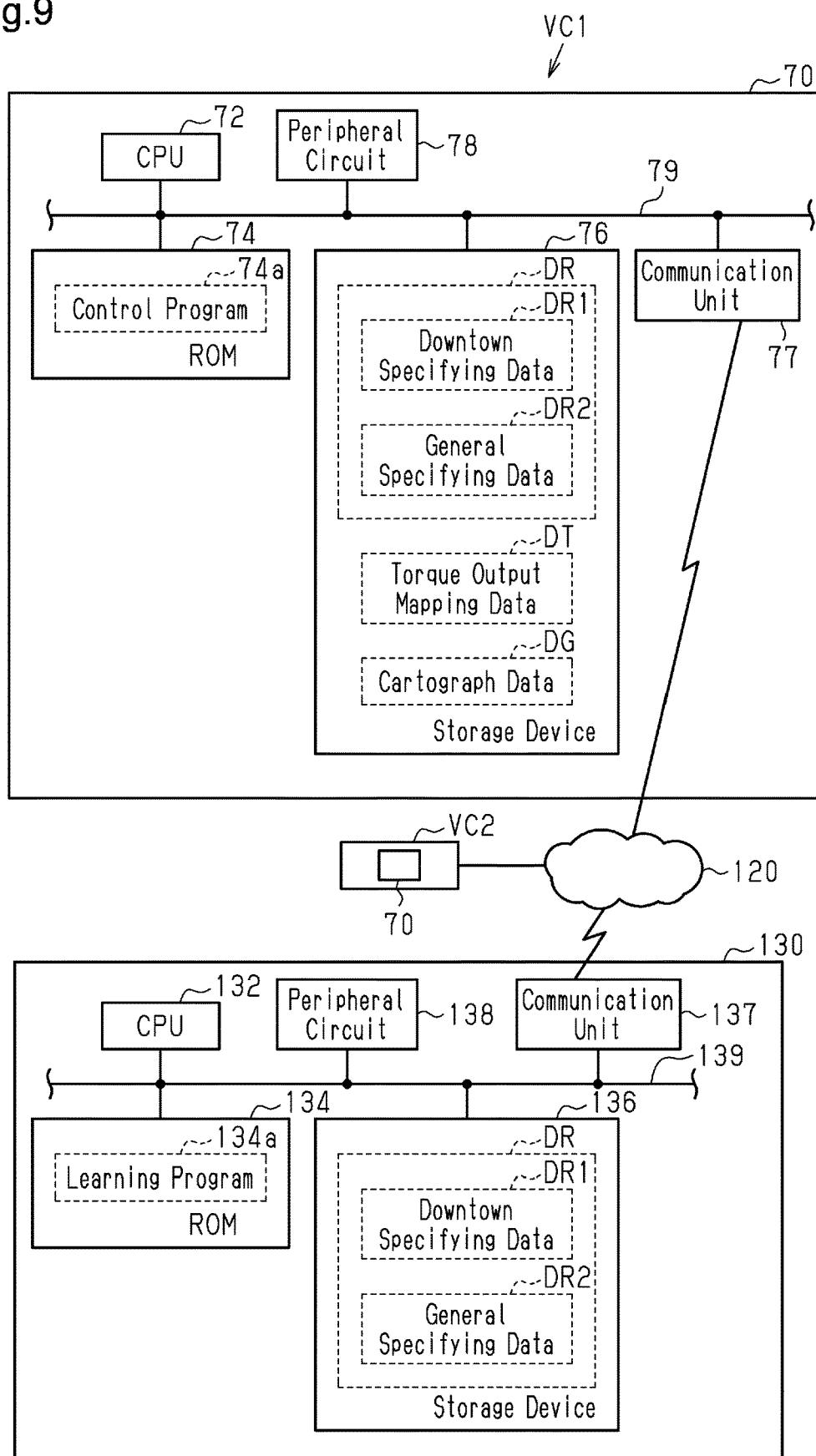
FIG. 9 is a diagram showing the configurations of a system in a third embodiment.

FIG. 9 shows the configurations of a control system that executes reinforcement learning in the present embodiment. For the sake of convenience, in FIG. 9, the same reference numerals are given to the components that are the same as those in FIG. 1.

As shown in FIG. 9, the ROM 74 of the controller 70 arranged in the vehicle VC1 stores the control program 74a but does not store the learning program 74b. The controller 70 includes a communication unit 77. The communication unit 77 is configured to communicate with a data analysis center 130 through an external network 120 of the vehicle VC1.

The data analysis center 130 analyzes data transmitted from vehicles VC1, VC2, . . . . The data analysis center 130 includes a CPU 132, a ROM 134, an electrically rewritable nonvolatile memory (storage device 136), a peripheral circuit 138, and a communication unit 137, which are configured to communicate with each other through a local network 139. The ROM 134 stores a learning program 134a. The storage device 136 stores the relationship specifying data DR.

Figure 10:
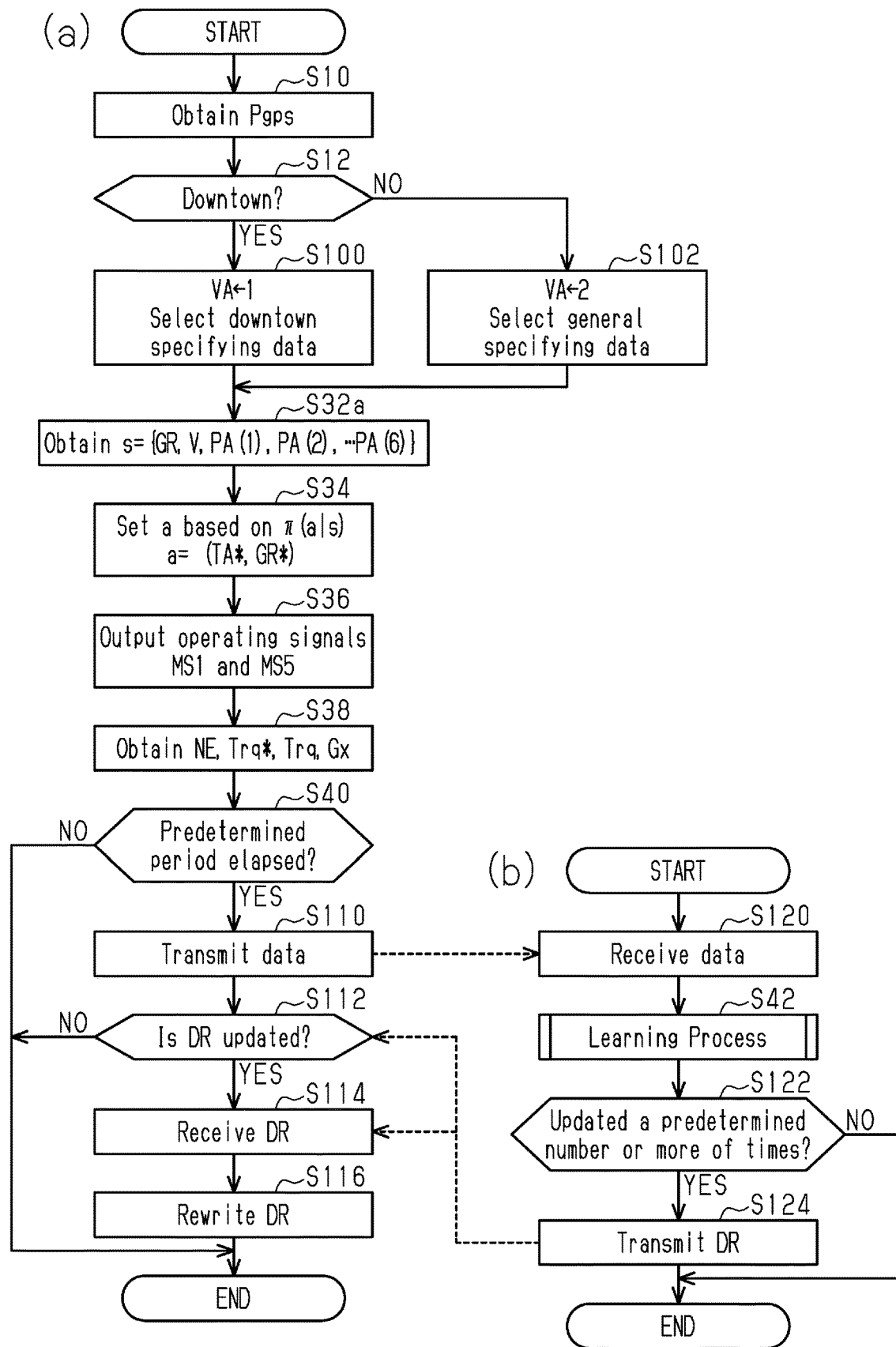
FIG. 10 is a flowchart showing the procedures of a process executed by the system in the third embodiment.

FIG. 10 shows the procedures of a reinforcement learning process in the present embodiment. The process shown in (a) of FIG. 10 is implemented by the CPU 72 executing the control program 74a stored in the ROM 74 shown in FIG. 9. The process shown in (b) of 10 is implemented by the CPU 132 executing the learning program 134a stored in the ROM 134. For the sake of convenience, in FIG. 10, the same step numbers are given to the processes that correspond to those in FIG. 8. The process shown in FIG. 10 will be described below along a temporal sequence of reinforcement learning.

In a series of the processes (a) of FIG. 10, the CPU 72 executes the processes of S10, S12, S100, S102, S32a, and S34 to S38. If it is determined that a predetermined period has elapsed (S40: YES), the CPU 72 operates the communication unit 77 to transmit data used in the updating process of the relationship specifying data DR (S110). The data subject to transmission includes a value of the area variable VA, time series data of the rotation speed NE, the torque instruction value Trq*, the torque Trq, and the acceleration rate Gx, the state set Sj, and the action set Aj in a predetermined period.

As shown in (b) of FIG. 10, the CPU 132 receives the transmitted data (S120) and updates the relationship specifying data DR based on the received data (S42). The CPU 132 determines whether the number of times the relationship specifying data DR is updated is greater than or equal to a predetermined number of times (S122). If it is determined that the number is greater than or equal to the predetermined number of times (S122: YES), the CPU 132 operates the communication unit 137 to transmit the relationship specifying data DR to the vehicle VC1 from which data was received in the process of S120 (S124). When the process of S124 is completed or a negative determination is made in S122, the CPU 132 temporarily ends the series of the processes shown in (b) of FIG. 10.

As shown in (a) of FIG. 10, the CPU 72 determines whether there is updated data (S112). If there is updated data (S112: YES), the CPU 72 receives the updated relationship specifying data DR (S114). The CPU 72 rewrites the relationship specifying data DR that is used in S34 with the received relationship specifying data DR (S116). When the process of S116 is completed or a negative determination is made in S40 or S112, the CPU 72 temporarily ends the series of the processes shown in (a) of FIG. 10.

In the present embodiment, the updating process of the relationship specifying data DR is executed outside the vehicle VC1. This reduces calculation loads on the controller 70. In addition, for example, when data is received from multiple vehicles VC1 and VC2 in the process of S120, and the process of S42 is executed, the number of pieces of data used in learning are readily increased.

Correspondence Relationship

Correspondence relationship between the items in the embodiments described above and the items described in "Summary" is as follows. Hereinafter, the correspondence relationship is shown with each number of the aspects described in "Summary."

[1,2] The execution device, that is, the processing circuitry, corresponds to the CPU 72 and the ROM 74 in FIG. 7, the CPU 112 and the ROM 114 shown in FIG. 3, and the CPUs 72 and 132 and the ROMs 74 and 134 in FIG. 9. The storage device corresponds to the storage device 76 in FIG. 7, the storage device 116 in FIG. 3, and the storage devices 76 and 136 in FIG. 9. The obtaining process corresponds to the processes of S30, S32, and S38 in FIG. 4 and the processes of S10, S12, S100, S102, S32a, and S38 in FIGS. 8 and 10. The operating process corresponds to the process of S36. The reward calculation process corresponds to the processes of S52 to S64. The updating process corresponds to the processes of S66 to S72. The update mapping corresponds to a mapping specified by an instruction to execute the processes of S66 to S72 in the learning program 74b. The changing process corresponds to a process that variably sets the coefficient K in accordance with the area variable VA in S54, a process that variably sets condition (A) and condition (B) in accordance with the area variable VA in S56, and a process that variably sets the threshold value PAth in accordance with the area variable VA in S62.

[3] The control mapping data corresponds to the map data DM.

[4] The execution device and the storage device respectively correspond to the CPU 72 and the ROM 74 and the storage device 76 in FIG. 7.

[5 to 7] The first execution device corresponds to the CPU 72 and the ROM 74. The second execution device corresponds to the CPU 132 and the ROM 134.

Other Embodiments

The embodiments may be modified as follows. The embodiments and the following modified examples can be combined as long as the combined modified examples remain technically consistent with each other.

Area Variable

The area variable that distinguishes between areas separated based on average vehicle speeds in a forward direction is not limited to whether the current position is downtown. The area variable may determine, for example, whether the current position is a congested area. Alternatively, the area variable may distinguish, for example, between three areas, that is, downtown, a congested area, and the remaining area.

The area variable is not limited to a variable that distinguishes between divided areas in a specified country. The area variable may, for example, distinguish between countries.

Changing Process

In the process of S56, condition (A) and condition (B) are variably set in accordance with whether the current position is downtown. However, there is no limitation to such a configuration. For example, in the processes of S58 and S60, the coefficient K1 may be variably set in accordance with whether the current position is downtown. That is, for example, if the coefficient K1 is decreased in downtown, satisfying condition (A) and condition (B) is not very advantageous for increasing the total reward. This facilitates learning for increasing the efficiency $\eta e$.

In the process of S62, the threshold value PAth is variably set in accordance with whether the current position is downtown. However, there is no limitation to such a configuration. For example, in the process of S64, a coefficient K2 may be variably set in accordance with whether the current position is downtown. That is, for example, if the coefficient K2 is decreased in downtown, a negative determination in S62 is not very advantageous for increasing the total reward. This facilitates learning for increasing the efficiency $\eta e$.

Instead of executing one of the process that changes the criterion of acceleration response such as the processes S56 and S62 and the process that changes the reward in accordance with whether the criterion of acceleration response is met as in the modified example, both of the processes may be executed.

For example, while variably setting the coefficient K in accordance with the area variable VA in the process of S54, it may be configured to execute neither the process changing the criterion of acceleration response nor the process changing the reward in accordance with whether the criterion of acceleration response is met as in the modified example.

For example, in downtown, the condition may be changed so that condition (A) and condition (B) cannot be satisfied, and zero may be added to the reward r in the process of S60. Outside downtown, the reference efficiency $\eta er$ in the process of S54 may be set to an unobtainable high efficiency, and the greater one of the accumulated value and zero may be assigned to the reward r. This process is equivalent to not executing the process assigning a greater reward when acceleration response meets the criterion than when it does not meet the criterion in downtown and not executing the process that assigning a greater reward when the energy usage efficiency meets the criterion than when it does not meet the criterion outside downtown. Therefore, the process may be configured not to execute the process assigning a greater reward when acceleration response meets the criterion than when it does not meet the criterion in downtown and not to execute the process that assigning a greater reward when the energy usage efficiency meets the criterion than when it does not meet the criterion outside downtown. This process is also regarded as a process that changes at least one of the process assigning a greater reward when acceleration response meets the criterion than when it does not meet the criterion or the process assigning a greater reward when the energy usage efficiency meets the criterion than when it does not meet the criterion.

As described in "Area Variable," when the area variable distinguishes between countries, for example, switching may be performed between a reward that gives priority to a requirement for acceleration response and a reward that gives priority to a requirement for energy usage efficiency in accordance with national characteristics. When this is executed as a modified example of the first embodiment, the map data DM may be generated for each country. When executed as a modified example of the system shown in FIG. 9, relationship specifying data DR that is learned by the same reward may be uniformly transmitted to vehicles located in the same country. Relationship specifying data DR that is updated by different rewards may be transmitted to different countries.

The changing process is not limited to switching between the reward giving priority to a requirement for acceleration response and the reward giving priority to a requirement for energy usage efficiency. For example, when regulations for emission differ between countries, a criterion of emission components may be changed in accordance with each country.

Energy Usage Efficiency

In the embodiments described above, the energy usage efficiency is quantified based on only the operating point. However, there is no limitation to such a configuration. For example, as described below in "Action Variable," when the action variable includes ignition timing and a selected ignition timing is deviated from the minimum advance for the best torque (MBT), the energy usage efficiency may be corrected by being decreased in accordance with the deviation amount. When the action variable includes a variable related to air-fuel ratio control and a selected air-fuel ratio is deviated from a predetermined air-fuel ratio, the energy usage efficiency may be corrected in accordance with the deviation amount.

Dimensionality Reduction of Tabular Data

A process for reducing the dimensions of tabular data is not limited to that described in the embodiments. For example, since the accelerator operation amount PA rarely reaches the maximum value, the action value function Q may be configured not to be defined for a state in which the accelerator operation amount PA is greater than or equal to the specified amount. The throttle opening degree instruction value TA* and the like may be separately adapted for the state in which the accelerator operation amount PA is greater than or equal to the specified amount. For example, the dimensions may be reduced by omitting a value of the action corresponding to the throttle opening degree instruction value TA* that is greater than or equal to a specified value from possible values of the action.

Relationship Specifying Data

In the embodiments, the action value function Q is of a table-type. However, there is not limitation to such a configuration. For example, a function approximator may be used.

For example, instead of using the action value function Q, the policy 7C may be expressed by a function approximator in which the state s and the action a are independent variables and the probability of the action a is a dependent variable. A parameter that determines the function approximator may be updated in accordance with the reward r. In this case, separate function approximators may be provided for values of the area variable VA. Alternatively, for example, the area variable VA may be included in the state s as an independent variable of a single function approximator.

Operating Process

For example, as described in "Relationship Specifying Data," when the action value function is a function approximator, the action a that maximizes the action value function Q may be specified by inputting the state s and all combinations of discrete values of the action used as an independent variable of the table-type function in the embodiments into the action value function Q. In this case, for example, while using mainly the specified action a for operation, other actions may be selected at a predetermined probability.

For example, as described in "Relationship Specifying Data," when the policy 7C is a function approximator in which the state s and the action a are independent variables and the probability of the action a is a dependent variable, the action a may be selected based on the probability shown by the policy π.

Update Mapping

In the processes of S66 to S72, an c-soft on-policy Monte Carlo method is used. However, there is no limitation to such a configuration. For example, an off-policy Monte Carlo method may be used. Moreover, there is no limitation to a Monte Carlo method. For example, an off-policy temporal difference (TD) method may be used. An on-policy TD method such as a state-action-reward-state-action (SARSA) method may be used. An eligibility trace method may be used as on-policy learning.

For example, as described in "Relationship Specifying Data," the policy π may be expressed using a function approximator. When the policy π is directly updated based on the reward r, a policy gradient method may be used to configure the update mapping.

The subject that is directly updated by the reward r is not limited to only one of the action value function Q and the policy π. For example, as an actor-critic method, each of the action value function Q and the policy π may be updated. Further, in the actor-critic method, for example, a value function V may be updated instead of the action value function Q.

Action Variable

In the embodiments described above, the throttle opening degree instruction value TA* is used as the action variable related to the opening degree of the throttle valve. However, there is no limitation to such a configuration. For example, the responsiveness of the throttle opening degree instruction value TA* to the accelerator operation amount PA may be expressed in a waste time and a secondary delay filter. Two variables specifying the waste time and the secondary delay filter may be added, and the three variables may be used as the variables related to the opening degree of the throttle valve. In this case, the state variable may be an amount of change in the accelerator operation amount PA per unit time instead of the time series data of the accelerator operation amount PA.

In the embodiments described above, the variable related to the opening degree of the throttle valve and the variable related to the transmission ratio are used as the action variables. However, there is no limitation to such a configuration. For example, in addition to the variable related to the opening degree of the throttle value and the variable related to the transmission ratio, a variable related to ignition timing and a variable related to air-fuel ratio control may be used.

As described in "Internal Combustion Engine," when the internal combustion engine is of a compression ignition type, a variable related to an injection amount may be used instead of the variable related to the opening degree of the throttle valve. In addition, for example, a variable related to injection timing, a variable related to the number of injections performed in one combustion cycle and a variable related to a time interval between the end time and the start time of two fuel injections for one cylinder that are adjacent on a time-series basis in one combustion cycle may be used.

For example, when the transmission 50 is a multi-speed transmission, the action variable may include a current value of a solenoid valve that hydraulically adjusts the engagement state of a clutch.

As described below in "Electronic Device," when a subject of operation corresponding to an action variable includes a rotary electric machine, the action variable may include torque or electric current of a rotary electric machine. More specifically, a load variable, which is a variable related to load of a propulsive force generator, may be torque or electric current of the rotary electric machine instead of the variable related to the opening degree of the throttle valve and the injection amount.

As described in "Electronic Device," when a subject of operation corresponding to an action variable includes the lock-up clutch 42, the action variable may include a variable indicating an engagement state of the lock-up clutch 42. When the action variable includes the engagement state of the lock-up clutch 42, changing the value of the action variable in accordance with the priority level of a requirement for increasing the energy usage efficient is particularly advantageous.

State

In the embodiments, the time series data of the accelerator operation amount PA has six values that are sampled at equal intervals. However, there is no limitation to such a configuration. The data may have two or more sampling values that are obtained at different sampling timings. In this case, the data may have three or more sampling values or may be sampled at equal intervals.

The state variable related to the accelerator operation amount is not limited to the time series data of the accelerator operation amount PA and may be, for example, an amount of change in the accelerator operation amount PA per unit time as described in "Action Variable."

For example, as described in "Action Variable," when the action variable includes a current value of a solenoid valve, the state may include rotation speed of the input shaft 52 of the transmission, rotation speed of the output shaft 54, and hydraulic pressure adjusted by the solenoid valve. For example, as described in "Action Variable," when the action variable includes torque or output of a rotary electric machine, the state may include the state of charge and the temperature of the battery. For example, as described in "Action Variable," when the action includes a load torque of a compressor or consumed power of an air conditioner, the state may include the temperature of the vehicle interior.

Reward Calculation Process

Instead of the processes of S52 and S54, when the rotation speed NE is within a predetermined range for a predetermined period, a greater reward may be assigned than when the rotation speed NE is outside the predetermined range. When the current position is downtown, the predetermined range may be set to a lower rotation speed range than when the current position is outside downtown.

A process assigning a greater reward when the energy usage efficiency is relatively high than when relatively low is not limited to the process obtaining the difference between one and the ratio of an actual efficiency at an operating point to the reference efficiency. The process may, for example, obtain the difference between the reference efficiency and the actual efficiency at the operating point.

The process assigning a greater reward when the criterion related to acceleration response is met than when the criterion is not met is not limited to the process assigning a reward in accordance with whether the logical conjunction of condition (A) and condition (B) is true and the process assigning a smaller reward when condition (C) is satisfied. For example, only one of the process assigning a reward in accordance with whether the logical conjunction of condition (A) and condition (B) is true and the process assigning a smaller reward when condition (C) is satisfied may be included. For example, the process assigning a reward in accordance with whether the logical conjunction of condition (A) and condition (B) is true may be included. Alternatively, instead of executing the process assigning a reward in accordance with whether the logical conjunction of condition (A) and condition (B) is true, a process that assigns a reward in accordance with whether condition (A) is satisfied and a process that assigns a reward in accordance with whether condition (B) is satisfied may be executed.

For example, when condition (A) is satisfied, instead of uniformly assigning the same reward, a process may assign a greater reward when the absolute value of the difference between the torque Trq and the torque instruction value Trq* is relatively small than when relatively large. For example, when condition (A) is not satisfied, instead of uniformly assigning the same reward, a process may assign a smaller reward when the absolute value of the difference between the torque Trq and the torque instruction value Trq* is relatively large than when relatively small.

For example, when condition (B) is satisfied, instead of uniformly assigning the same reward, a process may change the amount of a reward in accordance with the amount of the acceleration rate Gx. For example, when condition (B) is not satisfied, instead of uniformly assigning the same reward, a process may change the amount of a reward in accordance with the amount of the acceleration rate Gx.

The reward calculation process is not limited to the process assigning a greater reward when the criterion related to acceleration response is met than when the criterion is not met and the process assigning a greater reward when the criterion of the energy usage efficiency is met than when the criterion is not met. For example, the reward calculation process may be configured by the process assigning a greater reward when the criterion related to acceleration response is met than when the criterion is not met and a process assigning a greater reward when a criterion of the state of the passenger compartment is met than when the criterion is not met. The process assigning a greater reward when the criterion of the state of the passenger compartment is met than when the criterion is not met may be a process assigning a greater reward when the vibration magnitude of the vehicle is relatively low than when relatively high. For example, the process assigns a greater reward when the vibration magnitude of the vehicle is less than or equal to a predetermined value than when the vibration magnitude is greater than the predetermined value. Alternatively, a process may assign a greater reward when the noise level of the vehicle is relatively low than when relatively high. For example, the process assigns a greater reward when the noise level of the vehicle is less than or equal to a predetermined value than when the noise level is greater than the predetermined value.

For example, the process assigning a greater reward when the criterion related to acceleration response is met than when the criterion is not met and a process assigning a greater reward when an emission property meets a criterion than when it does not meet the criterion may be included. For example, the process assigning a greater reward when the criterion of energy usage efficiency is met than when the criterion is not met and the process assigning a greater reward when the emission property meets the criterion than when it does not meet the criterion may be included. For example, three processes, that is, the process assigning a greater reward when the criterion related to acceleration response is met than when the criterion is not met, the process assigning a greater reward when the criterion of the energy usage efficiency is met than when the criterion of the energy usage efficiency is not met, and the process assigning a greater reward when the criterion of the emission property is met than when the criterion of the emission property is not met, may be included. That is, when rewards are assigned based on different criteria that are incompatible with each other, the way of assigning the rewards may be changed in accordance with the area variable, so that the relationship specifying data is learned more appropriately to each area.

As described in "Action Variable," when the action variable includes a current value of the solenoid valve of the transmission 50, the reward calculation process may include, for example, at least one of the following three processes (a) to (c).

Process (a) assigns a greater reward when the transmission switches the transmission ratio within a predetermined time than when the time taken to switch the transmission ratio exceeds the predetermined time.

Process (b) assigns a greater reward when the absolute value of a change rate of rotation speed of the input shaft 52 of the transmission is less than or equal to an input-side predetermined value than when the absolute value is greater than the input-side predetermined value.

Process (c) assigns a greater reward when the absolute value of a change rate of rotation speed of the output shaft 54 of the transmission is less than or equal to an output-side predetermined value than when the absolute value is greater than the output-side predetermined value.

Process (a) corresponds to the process assigning a greater reward when acceleration response is relatively high than when relatively low. Processes (b) and (c) correspond to the process assigning a greater reward when vibration is relatively large than when relatively small. In other words, the processes correspond to the process assigning a greater reward when the state of the passenger compartment meets the criterion than when it does not meet the criterion.

For example, as described in "Action Variable," when the action variable includes torque or output of a rotary electric machine, the following processes may be included. A process assigns a greater reward when the state of charge of the battery is within a predetermined range than when the state of charge is outside the predetermined range, and a process assigns a greater reward when the temperature of the battery is within a predetermined range than when the temperature of the battery is outside the predetermined range. For example, as described in "Action Variable," when the action variable includes a load torque of a compressor or consumed power of an air conditioner, a process may be additionally executed to assign a greater reward when the temperature of the vehicle interior is within a predetermined range than when the temperature of the vehicle interior is outside the predetermined range. This process corresponds to a process assigning a greater reward when the comfortableness of the passenger compartment is relatively high than when relatively low.

Method for Generating Vehicle Controlling Data

In the process of S34 in FIG. 4, the action is set based on the action value function Q. Instead, all possible actions may be selected at an equal probability.

Control Mapping Data

Control mapping data associates the state of the vehicle with the value of the action variable that maximizes an expected return in a one-to-one relationship so that when a state of the vehicle is input, the value of the action variable that maximizes the expected return is output. The control mapping data is not limited to map data. For example, a function approximator may be used. For example, as described in "Update Mapping," this may be implemented, when a policy gradient method or the like is used, by expressing the policy 7C in Gaussian distribution that shows the probability of a value of the action variable, expressing an average value using a function approximator, updating a parameter of the function approximator expressing the average value, and using the learned average value as control mapping data. That is, the average value that is output from the function approximator is regarded as a value of the action variable that maximizes the expected return. In this case, a separate function approximator may be arranged for each value of the area variable VA. Alternatively, a single function approximator may be used, and the area variable VA may be included in the state s, which is an independent variable of the function approximator.

Electronic Device

The operating unit of the internal combustion engine that is operated in accordance with the action variable is not limited to the throttle valve 14. For example, the ignition device 26 or the fuel injection valve 16 may be used as the operation unit.

The electronic device that is operated in accordance with the action variable and is used as a drive system device arranged between the propulsive force generator and the drive wheels is not limited to the transmission 50. For example, the lock-up clutch 42 may be used as the electronic device.

As described below in "Propulsive Force Generator," when the propulsive force generator includes a rotary electric machine, the electronic device operated in accordance with the action variable may be a power conversion circuit such as an inverter connected to the rotary electric machine. The electronic device is not limited to a device in the on-board drive system and instead may be, for example, an on-board air conditioner. In this case, for example, when the on-board air conditioner is driven by rotational drive force of the propulsive force generator, part of drive force of the propulsive force generator is supplied to the drive wheels 60. Since the part of drive force is dependent on a load torque of the on-board air conditioner, including the action variable in the load torque of the on-board air conditioner is also advantageous. In addition, for example, even when the on-board air conditioner is configured not to use rotational drive force of the propulsive force generator, the energy usage efficiency is still affected. Adding consumption power of the on-board air conditioner to the action variable is advantageous.

Vehicle Control System

In the example shown in FIG. 10, the entire process of S42 is executed by the data analysis center 130. However, there is not limitation to such a configuration. For example, the data analysis center 130 may be configured to execute the processes of S66 to S72 and not to execute the processes of S52 to S64, which correspond to the reward calculation process. In S110, the result of the reward calculation process may be transmitted.

In the example shown in FIG. 10, the process setting the action based on the policy $\pi$ (the process of S34) is executed at the vehicle side. However, there is no limitation to such a configuration. For example, the data obtained by the process of S32a may be transmitted from the vehicle VC1, the transmitted data may be used to set the action a in the data analysis center 130, and the set action may be transmitted to the vehicle VC1.

The vehicle control system is not limited to one configured by the controller 70 and the data analysis center 130. For example, a mobile terminal carried by a user may be used instead of the data analysis center 130. For example, the vehicle control system may be configured by the controller 70, the data analysis center 130, and the mobile terminal. This may be implemented by, for example, the mobile terminal executing the process S34.

Execution Device

The execution device is not limited to a device that includes the CPU 72 (112, 132) and the ROM 74 (114, 134) and executes the software processes. For example, a dedicated hardware circuit (e.g., ASIC) configured to process at least some of the software processes executed in the embodiments may be provided. More specifically, the execution device may have any one of the following configurations (a) to (c). Configuration (a) includes a processor that executes all of the above-described processes according to programs and a program storage device such as a ROM that stores the programs. Configuration (b) includes a processor and a program storage device that execute some of the above-described processes in accordance with programs and a dedicated hardware circuit that executes the remaining processes. Configuration (c) includes a dedicated hardware circuit that executes all of the above-described processes. Multiple software execution devices each including a processor and a program storage device and multiple dedicated hardware circuits may be provided. More specifically, the above-described processes may be executed by processing circuitry that includes at least one of one or more software execution devices or one or more dedicated hardware circuits. The program storage device, that is, a computer readable medium, includes any medium that can be accessed from a general-purpose computer or a dedicated computer.

Storage Device

In the embodiments, the storage device that stores the relationship specifying data DR is different from the storage devices (ROMs 74, 114, 134) that store the learning programs 74b and 114a and the control program 74a.

Internal Combustion Engine

The internal combustion engine is not limited to one including a port injection valve that injects fuel into the intake passage 12 as a fuel injection valve and may be, for example, one including a direct injection valve that directly injects fuel into the combustion chamber 24 or one including both a port injection valve and a direct injection valve.

The internal combustion engine is not limited to a spark ignition type internal combustion engine and may be, for example, a compression ignition type internal combustion engine that uses, for example, light oil as fuel.

Propulsive Force Generator

The propulsive force generator mounted on the vehicle is not limited to an internal combustion engine. For example, as in a hybrid vehicle, an internal combustion engine and a rotary electric machine may be used. For example, as in an electric car or fuel cell vehicle, the propulsive force generator may be only a rotary electric machine.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A method for generating vehicle controlling data, the method, comprising: when relationship specifying data that specifies a relationship between a state of a vehicle and an action variable, which is a variable related to operation of an electronic device mounted on the vehicle, is stored in a storage device,
executing an operating process that operates the electronic device with processing circuitry;
executing an obtaining process that obtains an area variable, which is a variable indicating an area in which the vehicle is located, a state of the vehicle based on a detection value of a sensor with the processing circuitry, and includes a value distinguishing between areas divided based on an average vehicle speed;
executing a reward calculation process that assigns a reward based on the state of the vehicle obtained by the obtaining process with the processing circuitry, the reward being larger when a property of the vehicle meets a predetermined criterion and relatively smaller when the property of the vehicle does not meet the predetermined criterion; and
executing an updating process that uses the state of the vehicle obtained by the obtaining process, a value of the action variable used for operation of the electronic device, and the reward corresponding to operation of the electronic device as inputs to a predetermined update mapping to update the relationship specifying data with the processing circuitry, wherein
the update mapping is configured to output the relationship specifying data that is updated to increase an expected return of the reward when the electronic device is operated in accordance with the relationship specifying data, and
the reward calculation process includes a changing process that changes a reward assigned when the area variable equals a second value indicating that the average vehicle speed is high and the property of the vehicle is a predetermined property from a reward assigned when the area variable equals a first value indicating that the average vehicle speed is low and the property of the vehicle is the predetermined property.

2. The method according to claim 1, wherein
the predetermined criterion includes a criterion related to acceleration response and a criterion related to energy usage efficiency,
the reward calculation process includes a first process that assigns a greater reward when the criterion related to the acceleration response is met than when not met and a second process that assigns a greater reward when the criterion related to the energy usage efficiency is met than when not met, and
the changing process includes a process that changes at least one of the first process or the second process so that an increase in the energy usage efficiency results in a greater reward in an area where the average vehicle speed is low as compared to an area where the average vehicle speed is high.

3. The method according to claim 1, further comprising:
executing a process that generates control mapping data that associates the state of the vehicle with a value of the action variable so that the state of the vehicle is used as an input to output the value of the action variable based on the relationship specifying data updated by the updating process with the processing circuitry.

4. A vehicle controller, comprising:
a storage device for storing instructions; and
the processing circuitry executes the instructions to cause the processing circuitry to execute the method according to claim 1.

5. The vehicle controller of claim 4, wherein:
the processing circuitry further includes a first execution device that is mounted on a vehicle and a second execution device that is not mounted on the vehicle,
the first execution device is configured to execute at least the obtaining process and the operating process, and
the second execution device is configured to execute at least the updating process.

6. A learning device for a vehicle, the learning device, comprising:
the second execution device according to claim 5.

* * * * *